(12) United States Patent
Park et al.

(10) Patent No.: US 12,425,927 B2
(45) Date of Patent: *Sep. 23, 2025

(54) NETWORK SLICE INFORMATION FOR HANDOVER PROCEDURE

(71) Applicant: Peninsula Technologies, LLC, Allen, TX (US)

(72) Inventors: Kyungmin Park, Vienna, VA (US); Esmael Hejazi Dinan, McLean, VA (US); Alireza Babaei, Fairfax, VA (US); Hyoungsuk Jeon, Centreville, VA (US)

(73) Assignee: Peninsula Technologies, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,251

(22) Filed: Sep. 7, 2021

(65) Prior Publication Data

US 2021/0410019 A1 Dec. 30, 2021

Related U.S. Application Data

(63) Continuation of application No. 15/972,037, filed on May 4, 2018, now Pat. No. 11,122,470.

(Continued)

(51) Int. Cl.
*H04W 36/10* (2009.01)
*H04W 8/24* (2009.01)
(Continued)

(52) U.S. Cl.
CPC ... *H04W 36/0016* (2013.01); *H04W 36/0064* (2023.05); *H04W 36/13* (2023.05); *H04W 36/22* (2013.01); *H04W 76/18* (2018.02); *H04W 8/24* (2013.01); *H04W 28/0268* (2013.01); *H04W 36/00692* (2023.05); *H04W 36/00698* (2023.05)

(58) Field of Classification Search
USPC .......................................................... 370/331
See application file for complete search history.

(56) References Cited

U.S. PATENT DOCUMENTS 11,140,544 B2 * 10/2021 Yang ..................... H04W 48/18
2015/0317434 A1 * 11/2015 Kondo ................... A61B 6/463
705/3

(Continued)

OTHER PUBLICATIONS

R3-171097; 3GPP TSG-RAN WG3 #95bis; Spokane, Washington, USA, Apr. 3-7, 2017; Source: Qualcomm Incorporated; Title: TP for network slicing description.

(Continued)

*Primary Examiner* — Gregory B Sefcheck
*Assistant Examiner* — Majid Esmaeilian
(74) *Attorney, Agent, or Firm* — Ascenda Law Group, PC

(57) ABSTRACT

A first base station determines that session resources for a network slice are not available for a wireless device. The first base station sends to a second base station and based on the determination, a request for a handover of the wireless device. The request comprises: an identifier of the network slice for the handover; and a cause information element indicating that a cause for the handover is that the session resources are not available for the network slice at the first base station. A response to the request is received from the second base station.

20 Claims, 23 Drawing Sheets

Related U.S. Application Data

(60) Provisional application No. 62/501,438, filed on May 4, 2017.

(51) Int. Cl.
  *H04W 28/02* (2009.01)
  *H04W 36/00* (2009.01)
  *H04W 36/22* (2009.01)
  *H04W 76/18* (2018.01)

(56) References Cited

U.S. PATENT DOCUMENTS

| | | | | |
|---|---|---|---|---|
| 2015/0327127 | A1* | 11/2015 | Centonza | H04W 36/0055 455/436 |
| 2015/0358883 | A1 | 12/2015 | Axelsson et al. | |
| 2016/0277965 | A1* | 9/2016 | Durowoju | H04W 28/0808 |
| 2016/0353350 | A1* | 12/2016 | Engstrom | H04W 36/0058 |
| 2017/0054595 | A1* | 2/2017 | Zhang | H04L 41/0897 |
| 2017/0079059 | A1* | 3/2017 | Li | H04W 16/02 |
| 2017/0086118 | A1* | 3/2017 | Vrzic | H04W 36/0011 |
| 2017/0164349 | A1* | 6/2017 | Zhu | H04W 40/20 |
| 2017/0366679 | A1* | 12/2017 | Mohamed | H04L 12/1467 |
| 2018/0041994 | A1* | 2/2018 | Zhang | H04W 64/00 |
| 2018/0124660 | A1* | 5/2018 | Zhang | H04W 36/0055 |
| 2018/0220344 | A1 | 8/2018 | Shaheen | |
| 2018/0316615 | A1* | 11/2018 | Shaw | H04L 41/0806 |
| 2018/0376364 | A1* | 12/2018 | Keller | H04W 28/0215 |
| 2018/0376384 | A1* | 12/2018 | Youn | H04W 36/14 |
| 2019/0058997 | A1 | 2/2019 | Futaki et al. | |
| 2019/0098545 | A1* | 3/2019 | Zhang | H04W 36/12 |
| 2019/0158360 | A1 | 5/2019 | Xu et al. | |
| 2019/0261187 | A1 | 8/2019 | Chen et al. | |
| 2019/0261234 | A1 | 8/2019 | Park et al. | |
| 2019/0327153 | A1* | 10/2019 | Wahlqvist | H04L 41/5019 |
| 2020/0059989 | A1* | 2/2020 | Velev | H04W 76/32 |
| 2020/0100173 | A1* | 3/2020 | Casati | H04W 8/20 |
| 2020/0305054 | A1* | 9/2020 | Zee | H04W 36/0061 |

OTHER PUBLICATIONS

R3-171251; 3GPP TSG-RAN WG3 95bis; Spokane, Washington, USA, Apr. 3-7, 2017; Agenda item: 10.3; Source: Huawei; Title: Further Discussion on Slice Re-mapping.

R3-171252; 3GPP TSG-RAN WG3 95bis; Spokane, Washington, USA, Apr. 3-7, 2017, Agenda item: 10.3; Source: Huawei; Title: Dual Connectivity for Slicing.

3GPP TS 36.300 V14.2.0 (Mar. 2017); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

3GPP TS 36.331 V14.2.2 (Apr. 2017); 3rd Generation Partnership Project; Technical Specification Group Radio Access Network; Evolved Universal Terrestrial Radio Access (E-UTRA); Radio Resource Control (RRC); Protocol specification (Release 14).

R2-1702529; 3GPP TSG-RAN WG2 #97bis; Spokane, USA, Apr. 3-7, 2017; Agenda Item: 10.2.4.2; Source: Xiaomi; Title: Visibility of Slicing to UE; Document for: Discussion and Decision.

R2-1702539; 3GPP TSG-RAN2 #97bis; Spokane, USA, Apr. 3-7, 2017; Agenda Item: 10.2.4.2; Source: OPPO; Title: Discussion on Mobility Issues of Network Slicing; Document for: Discussion and Decision.

R2-1702551; 3GPP TSG-RAN WG2 #97bis; Spokane WA, USA, Apr. 3-7, 2017; Agenda Item: 10.2.4.2; Source: Ericsson; Title: Signalling aspects of network slicing; Document for: Discussion & Approval.

R2-1702552; 3GPP TSG-RAN WG2 #97bis; Spokane, USA, Apr. 3-7, 2017; Agenda Item: 10.2.4.2; Source: Ericsson; Title: Slice availability ; Document for: Discussion, Decision.

R2-1702553; 3GPP TSG-RAN WG2 #97bis; Spokane, USA, Apr. 3-7, 2017; Agenda Item: 10.2.4.2; Source: Ericsson; Title: Access Control and Resource Isolation for Slicing; Document for: Discussion, Decision.

R2-1702554; 3GPP TSG-RAN WG2 #97bis; Spokane, WA, USA, Apr. 3-7, 2017; Agenda Item: 10.2.4.2; Source: Ericsson; Title: Is UE AS slice agnostic or not?; Document for: Discussion.

R2-1702588; 3GPP TSG-RAN WG2#97bis; Spokane, USA, Apr. 3-7, 2017; Agenda item: 10.2.4.2; Source: Huawei, HiSilicon; Title: UE Awareness of Network Slice; Document for: Discussion and Decision.

R2-1702589; 3GPP TSG-RAN WG2 #97bis; Spokane, USA, Apr. 3-7, 2017; Source: Huawei, HiSilicon; Title: RRC Support for Network Slicing; Agenda Item: 10.2.4.2; Document for: Discussion and Decision.

R2-1702590; 3GPP TSG-RAN WG2 97bis; Spokane, Washington, USA, Apr. 3-7, 2017; Agenda item: 10.2.4.2; Source: Huawei, HiSilicon; Title: Network Slice Selection Assistance Information over RRC; Document for: Discussion and Decision.

R2-1702843; 3GPP TSG-RAN WG2 Meeting #97bis; Spokane, USA, Apr. 3-7, 2017; Agenda item: 10.2.4.2; Source: ZTE, ZTE Microelectronics; Title: Consideration on the NW slice in RAN; Document for: Discussion and Decision.

R2-1702969; 3GPP TSG RAN WG2 #97bis; Spokane, USA, Apr. 3-7, 2017; Agenda Item: 10.2.4.2; Source: Coolpad Title: Discussion on UE RRC modeling to support multiple slices per-UE; Document for: Discussion.

R2-1703101; 3GPP TSG-RAN WG2 Meeting #97bis; Spokane, USA, Apr. 3-7, 2017; Source: CATT; Title: Slice visibility to UE AS; Agenda item: 10.2.4.2; Document for: Discussion & Decision.

R2-1703337; 3GPP TSG-RAN WG2 Meeting 97bis; Spokane, Washington USA, Apr. 3-7, 2017; Agenda item: 10.2.4.2; Source: Samsung; Title: Review on Network Slicing; Document for: Discussion & Decision.

R2-1703343; 3GPP TSG-RAN WG2 Meeting 97bis; Spokane, Washington USA, Apr. 3-7, 2017; Agenda item: 10.2.4.2; Source: Samsung; Title: Slice Information in RRC.

R2-1703762; 3GPP TSG RAN WG2#97bis; Spokane, USA, Apr. 3-7, 2017; 3GPP TSG-SA WG3 Meeting #86Bis; Tdoc S3-170902; Busan, Korea, Mar. 27-31, 2017; Title: Reply LS on privacy of registration and slice selection information.

R3-170675; 3GPP TSG-RAN WG3 #95; Athens, Greece, Feb. 13-17, 2017; Agenda Item: 10.4; Source: Ericsson; Title: Clarifications on the use of NSSAI in Network Slicing.

R3-170677; 3GPP TSG-RAN WG3 #95; Athens, Greece, Feb. 13-17, 2017; Agenda Item: 10.4; Source: Ericsson; Title: Mobility and Mapping of NW slices.

R3-171012; 3GPP TSG-RAN WG3 #95bis; Spokane, Washington, USA, Apr. 3-7, 2017; Agenda Item: 10.3; Source: CATT; Title: Discussion on Slice-aware mobility.

R3-171029; 3GPP TSG RAN WG3 Meeting #95bis; Spokane, USA, Apr. 3-7, 2017; Agenda item: 10.3; Source: ZTE; Title: NW Slice Availability Handling Approaches during Mobility.

R3-171047; 3GPP TSG-RAN WG3 #95bis; Spokane, Washington, USA, Apr. 3-7, 2017; Agenda item: 10.3; Source: Samsung; Title: RAN supporting Network Slicing.

R3-171115; 3GPP TSG-RAN WG3#95bis; Spokane, USA, Apr. 3-7, 2017; Agenda item: 10.3; Source: Nokia, Alcatel-Lucent Shanghai Bell; Title: Use of slice ID and NSSAI.

R3-171116; 3GPP TSG-RAN WG3#95bis; Spokane, USA, Apr. 3-7, 2017; Agenda item: 10.3; Source: Nokia, Alcatel-Lucent Shanghai Bell; Title: Connected mode mobility with slicing.

R3-171117; 3GPP TSG RAN WG3 Meeting #95bis; Spokane, USA; Apr. 3-7, 2017; Title: [Draft] LS on slice re-mapping during connected mode mobility.

R3-171128; 3GPP TSG-RAN WG3 Meeting #95bis; Spokane, Washington, USA, Apr. 3-7, 2017; Agenda item: 10.3; Source: LG Electronics Inc.; Title: Discussion on slice availability during mobility.

R3-171129; 3GPP TSG-RAN WG3 Meeting #95bis; Spokane, Washington, USA, Apr. 3-7, 2017; Agenda item: 10.3; Source: LG Electronics Inc.; Title: Mobility procedure considering network slice.

(56) References Cited

OTHER PUBLICATIONS

R3-171139; 3GPP TSG-RAN WG3 #95bis; Spokane WA, USA, Apr. 3-7, 2017; Agenda Item: 10.3; Source: Ericsson; Title: RAN aspects of NW slicing in Stage 2 specifications.
R3-171140; 3GPP TSG-RAN WG3 #95bis; R3-171140; Spokane WA, USA, Apr. 3-7, 2017; Agenda Item: 10.3; Source: Ericsson; Title: Stage 2 aspects of CN Instance selection signaling.
R3-171141; 3GPP TSG-RAN WG3 #95bis; Spokane WA, USA, Apr. 3-7, 2017; Agenda Item: 10.3; Source: Ericsson; Title: Signalling aspects of network slicing.
R3-171142; 3GPP TSG-RAN WG3 #95bis; Spokane, WA, USA, Apr. 3-7, 2017; Title: [Draft] LS regarding RAN support for NW slicing.
R3-171143; 3GPP TSG-RAN WG3 #95bis; Spokane WA, USA, Apr. 3-7, 2017; Agenda Item: 10.3; Source: Ericsson; Title: Slice re-mapping or removal during mobility.
R3-171144; 3GPP TSG-RAN WG3 #95bis; Spokane WA, USA, Apr. 3-7, 2017; Title: [Draft] LS to SA2 on slices and mobility.
R3-171250; 3GPP TSG-RAN WG3 95bis; Spokane, Washington, USA, Apr. 3-7, 2017; Agenda item: 10.3; Source: Huawei; Title: Slice Awareness of Availability during Mobility.
R3-171351; 3GPP TSG-RAN WG3 Meeting # 95bis; Spokane, USA, Apr. 3-7, 2017; Agenda item: 10.3; Source: LG Electronics Inc.; Title: TP for exchange of NSSAI in Xn Setup Procedure.
R3-171353; 3GPP TSG-RAN WG3 #95bis; Spokane WA, USA, Apr. 3-7, 2017; Agenda Item: 10.3; Source: Ericsson; Title: RAN aspects of NW slicing in Stage 2 specifications.
R3-171394; 3GPP TSG-RAN WG3 #95bis; Spokane, WA, USA, Apr. 3-7, 2017; Title: LS regarding RAN support for NW slicing.
R3-171395; 3GPP TSG-RAN WG3 #95bis; Spokane WA, USA, Apr. 3-7, 2017; Agenda Item: 10.3; Source: Ericsson; Title: Stage 2 aspects of CN Instance selection signaling.
R3-171396; 3GPP TSG RAN WG3 Meeting #95bis; Spokane, USA; Apr. 3-7, 2017; Title: LS on slice re-mapping during connected mode mobility.
3GPP TR 38.801 v14.0.0 (Year: 2017); 3rd Generation Partnership Project; Technical Specification Group Radio Access Network; Study on new radio access technology: Radio access architecture and interfaces (Release 14).
R3-171116; 3GPP TSG-RAN WG3#95bis; Spokane, USA, Apr. 3-7, 2017; Agenda item: 10.3; Source: Nokia, Alcatel-Lucent Shanghai Bell; Title:Connected mode mobility with slicing; Document for: Approval.

* cited by examiner

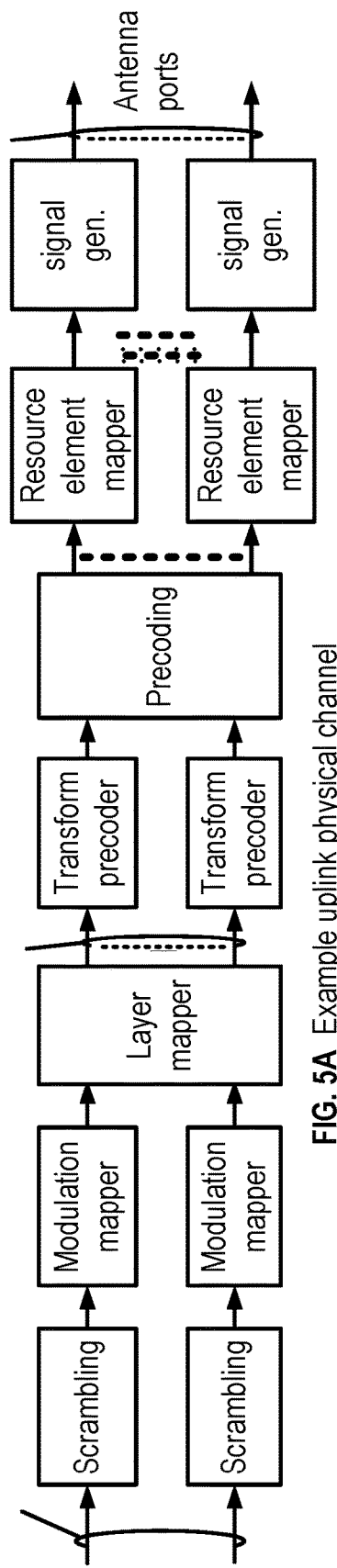
FIG. 5A Example uplink physical channel
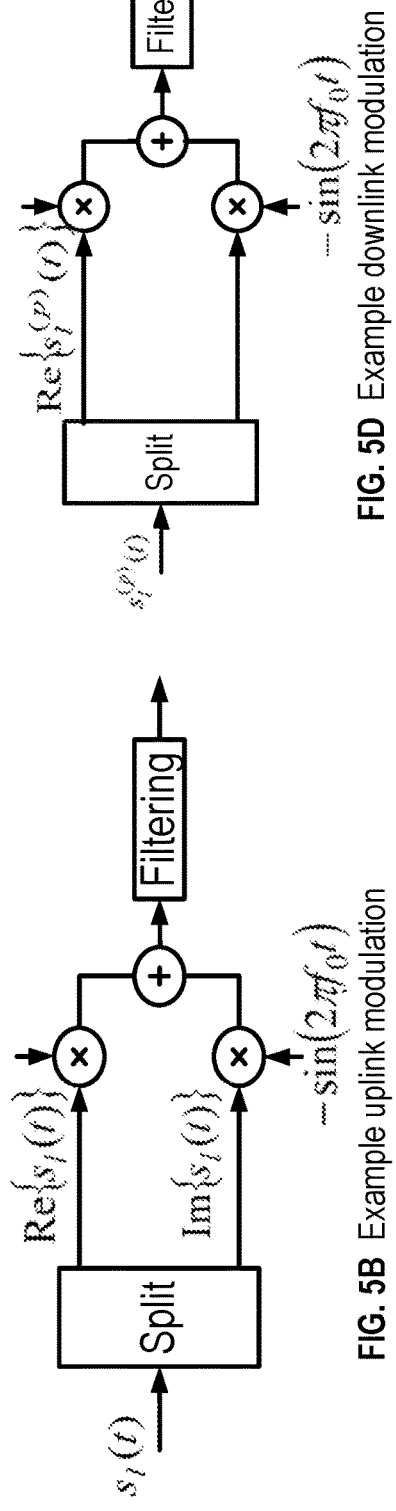
FIG. 5B Example uplink modulation
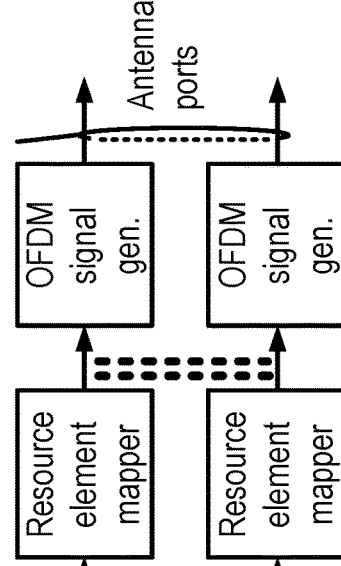
FIG. 5D Example downlink modulation
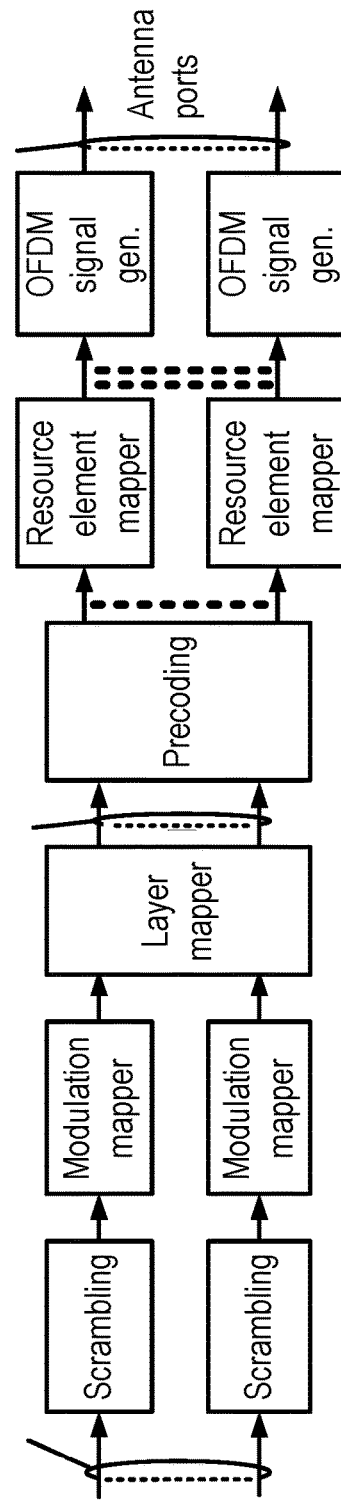
FIG. 5C Example downlink physical channel FIG. 7  Dual-Connectivity- two MAC entities at UE side

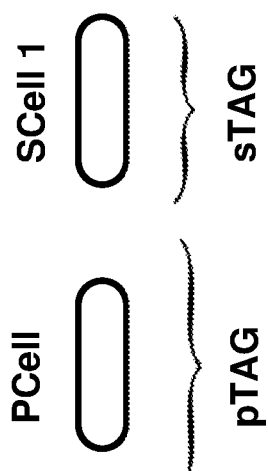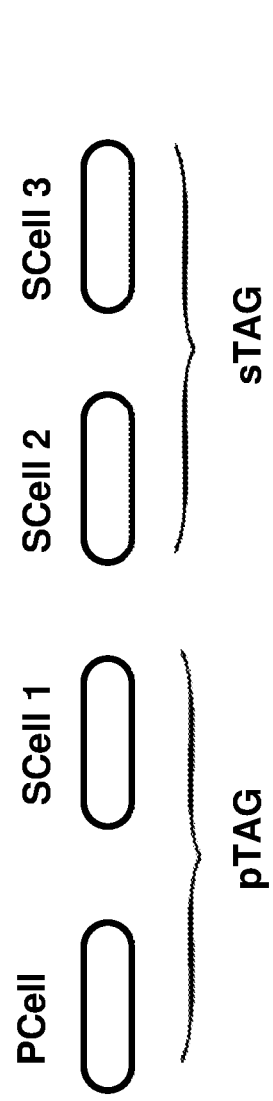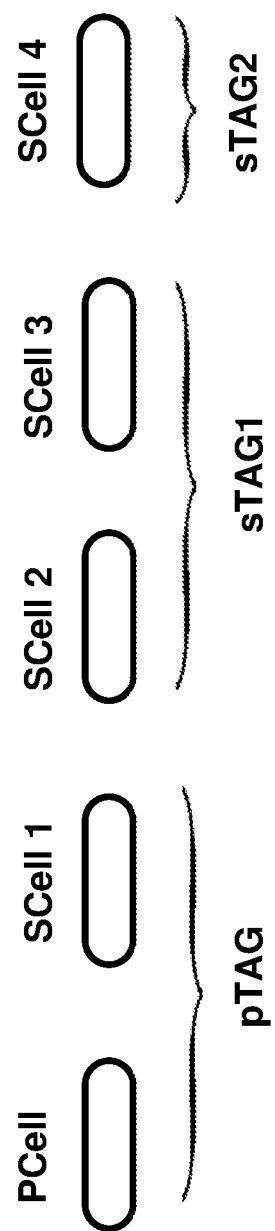
FIG. 8 gNB connected to NGC eLTE eNB connected to NGC

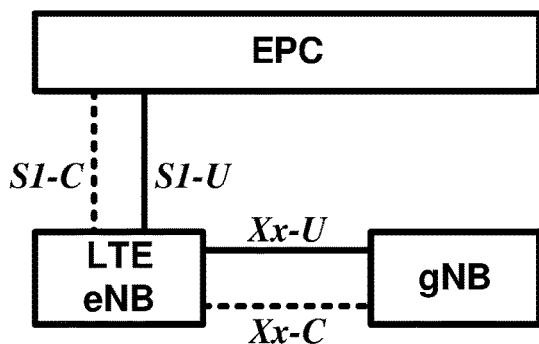

LTE eNB connected to EPC with non-standalone gNB.
gNB user plane connected to EPC via LTE eNB.

FIG. 11A

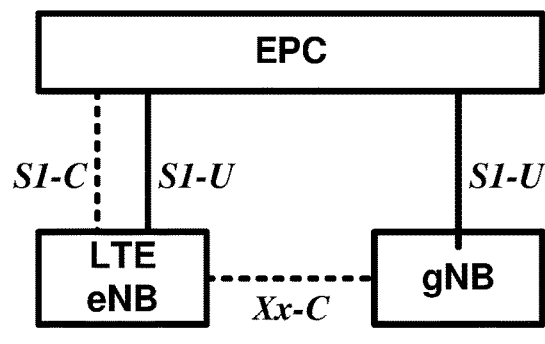

LTE eNB connected to EPC with non-standalone gNB.
gNB user plane connected to EPC directly.

FIG. 11B

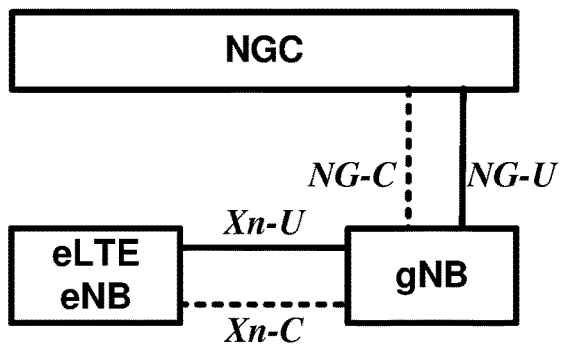

gNB connected to NGC with non-standalone eLTE eNB.
eLTE eNB user plane connected to NGC via gNB.

FIG. 11C

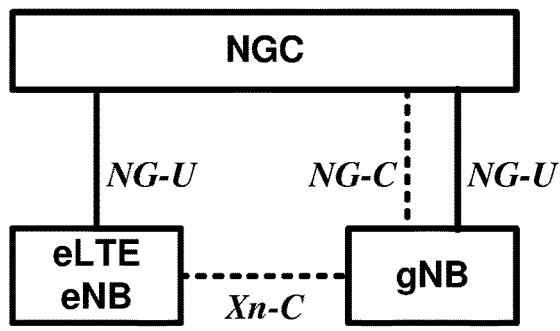

gNB connected to NGC with non-standalone eLTE eNB.
eLTE eNB user plane connected to NGC directly.

FIG. 11D

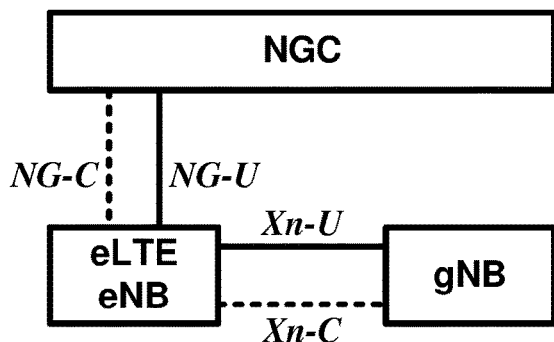

eLTE eNB connected to NGC with non-standalone gNB.
gNB user plane connected to NGC via eLTE eNB.

FIG. 11E

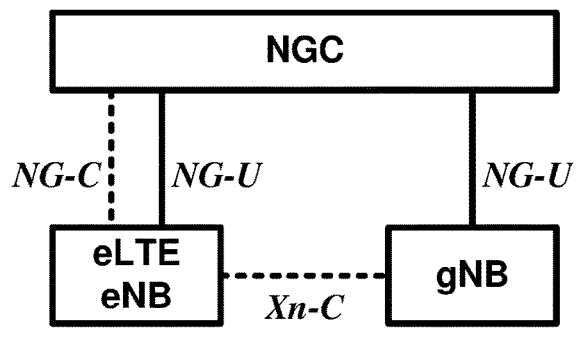

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Receive, by a 1st base station from a core network entity, a 1st message indicating a request for a session resource for a wireless device, where the session resource is associated with a 1st network slice
2010

Send, by the 1st base station to a 2nd base station, a 2nd message indicating a handover request for the wireless device towards a 1st cell of the 2nd base station, the 1st message comprising: a packet flow identifier of a packet flow associated with the 1st network slice; a network slice identifier of the 1st network slice; and a cause information element indicating that the handover request is to provide network slice(s) for the wireless device, wherein the network slice(s) comprise the 1st network slice
2020

Receive, by the 1st base station from the 2nd base station, a 3rd message indicating an acceptance or a rejection based on the 2nd message
2030

FIG. 20

Receive, by a 1st base station from a 2nd base station, a 1st message indicating a handover request for the wireless device towards a 1st cell of the 1st base station, the 1st message comprising: a packet flow identifier of a packet flow associated with a 1st network slice; a network slice identifier of the 1st network slice; and a cause information element indicating that the handover request is to provide network slice(s) for the wireless device, the cause information element based on a request of a core network entity for a session resource for the wireless device, where the session resource is associated with the 1st network slice
2110

Send, by the 1st base station to a 2nd base station, a 2nd message indicating an acceptance or a rejection based on the 1st message
2120

FIG. 21

Receive, by a 1st base station from a wireless device, a 1st message indicating that the wireless device requires a service associated with a 1st network slice
2210

Send, by the 1st base station to a 2nd base station, a 2nd message indicating a handover request for the wireless device towards a 1st cell of the 2nd base station, the 1st message comprising: a packet flow identifier of a packet flow associated with the 1st network slice; a network slice identifier of the 1st network slice; and a cause information element indicating that the handover request is to provide network slice(s) for the wireless device, where the network slice(s) comprise the 1st network slice
2220

Receive, by the 1st base station from the 2nd base station, a 3rd message indicating an acceptance or a rejection based on the 1st message
2230

FIG. 22

Receive, by a 1st base station from a core network entity, a 1st message indicating a request for a session resource for a wireless device, where the session resource is associated with a 1st network slice
2310

Send, by the 1st base station to a 2nd base station, a 2nd message indicating a secondary node addition/modification request for the wireless device, the 1st message comprising: a packet flow identifier of a packet flow associated with the 1st network slice; a network slice identifier of the 1st network slice; and a cause information element indicating that the secondary node addition/modification request is to provide network slice(s) for the wireless device, where the network slice(s) comprise the 1st network slice
2320

Receive, by the 1st base station from the 2nd base station, a 3rd message indicating an acceptance or a rejection based on the 1st message
2330

FIG. 23

NETWORK SLICE INFORMATION FOR HANDOVER PROCEDURE

CROSS-REFERENCE TO RELATED APPLICATIONS

This application is a continuation of U.S. patent application Ser. No. 15/972,037, filed May 4, 2018, which claims the benefit of U.S. Provisional Application No. 62/501,438, filed May 4, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 20 is a flow diagram of an aspect of an embodiment of the present disclosure.

FIG. 21 is a flow diagram of an aspect of an embodiment of the present disclosure.

FIG. 22 is a flow diagram of an aspect of an embodiment of the present disclosure.

FIG. 23 is a flow diagram of an aspect of an embodiment of the present disclosure.

DETAILED DESCRIPTION OF EMBODIMENTS

Figure 1:
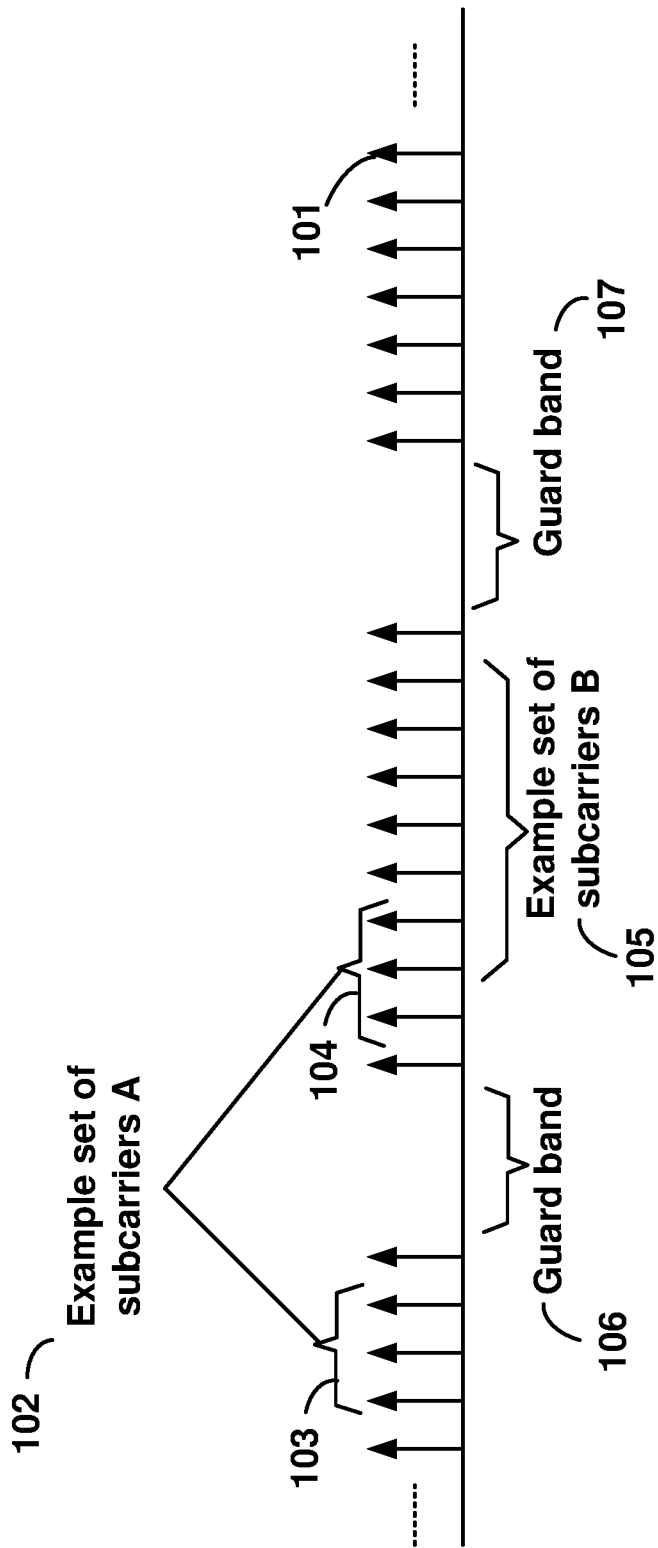
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
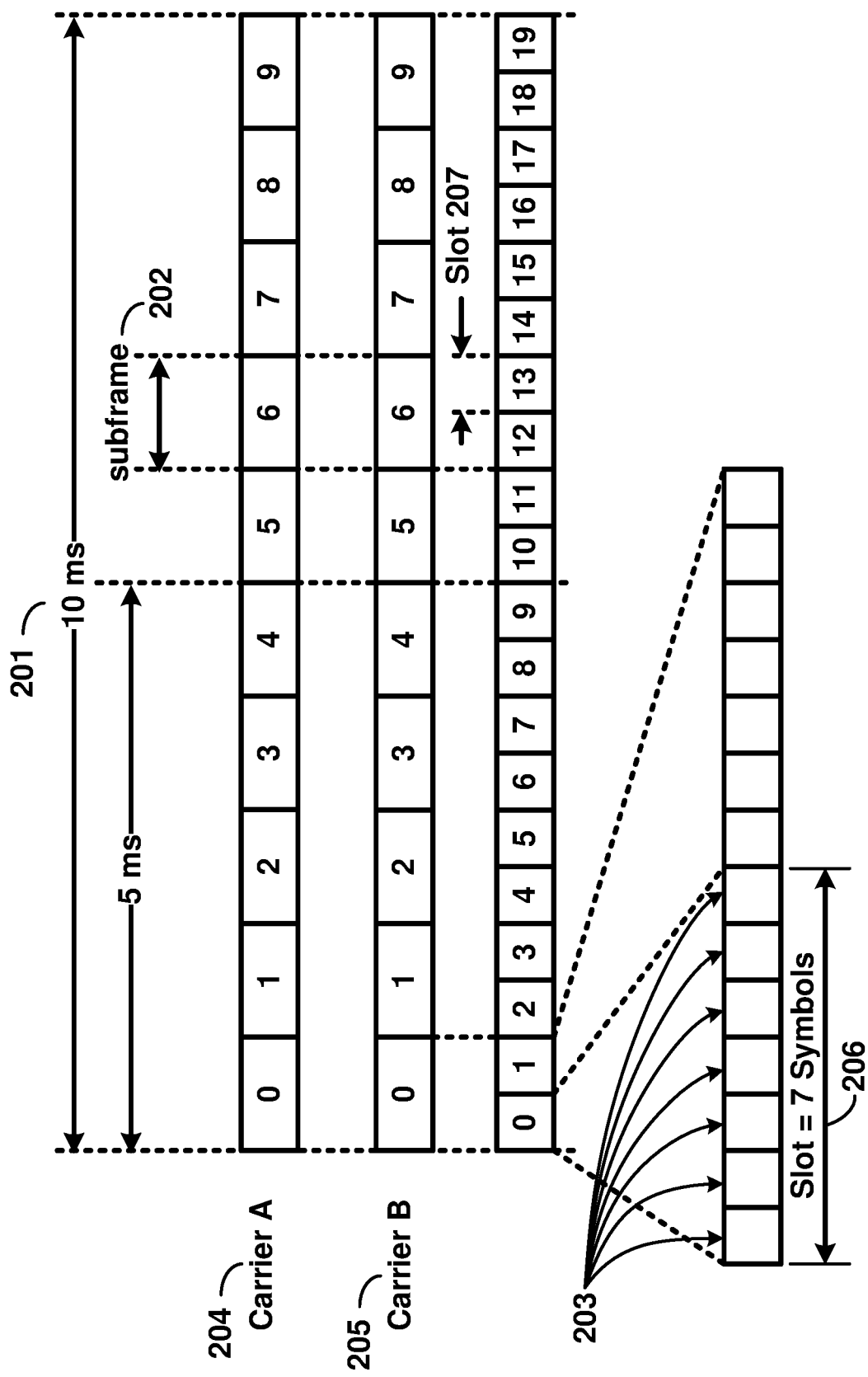
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
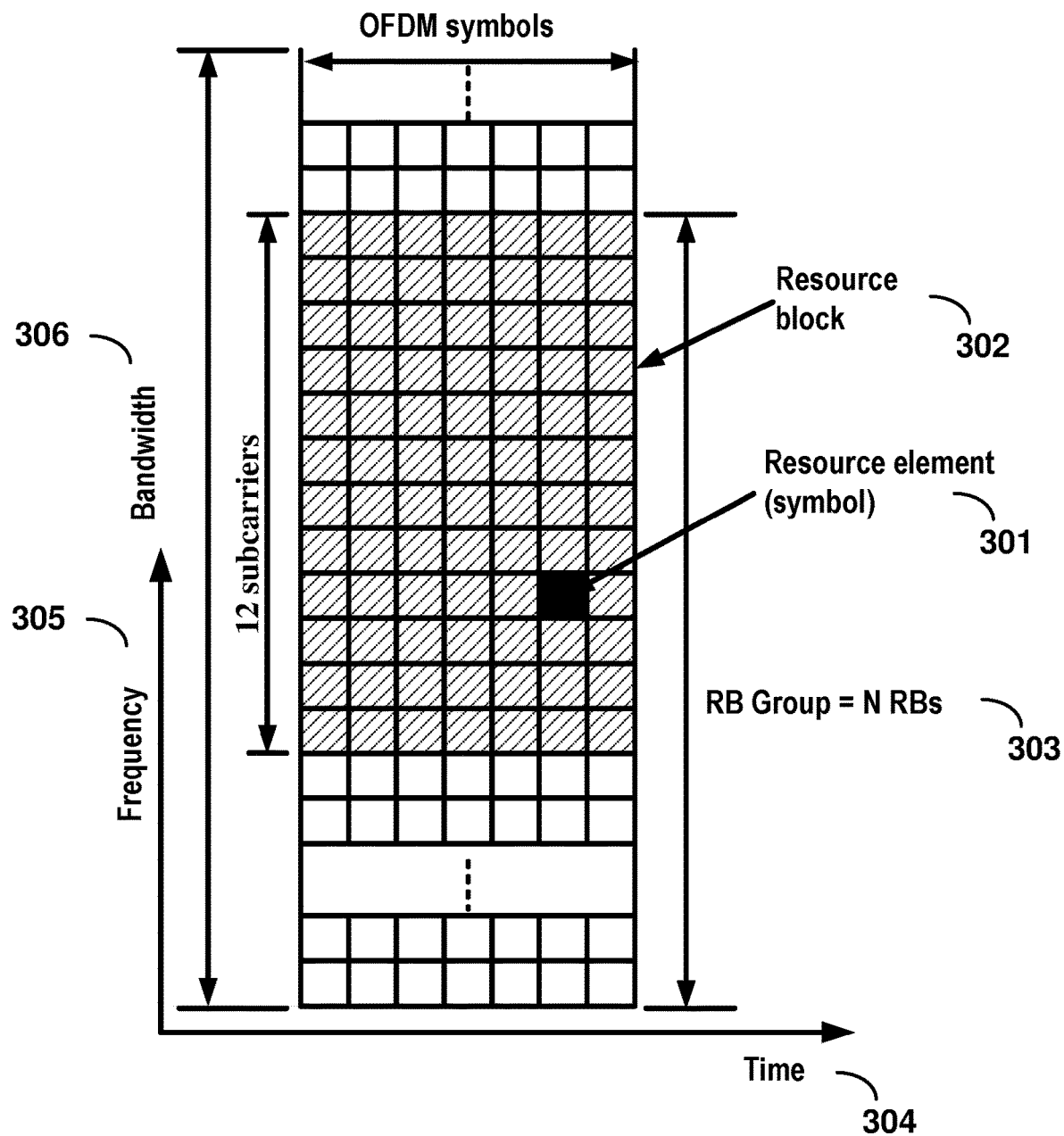
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g.

301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
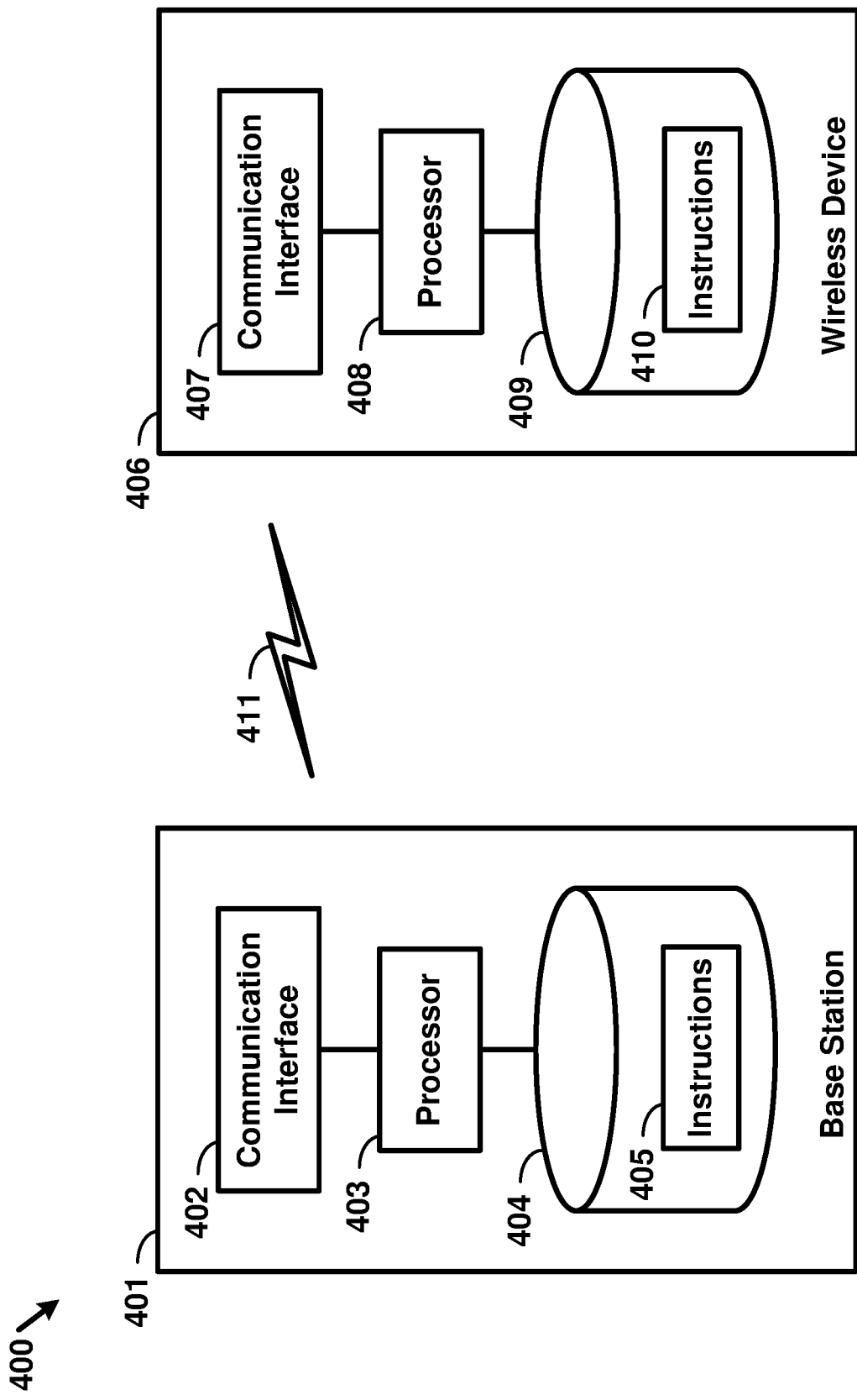
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
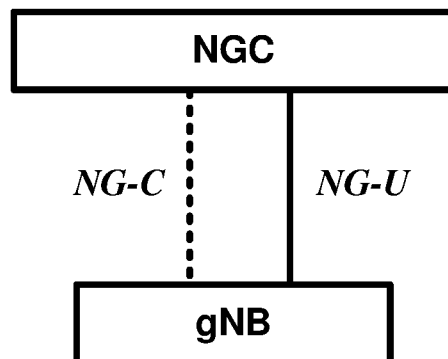
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
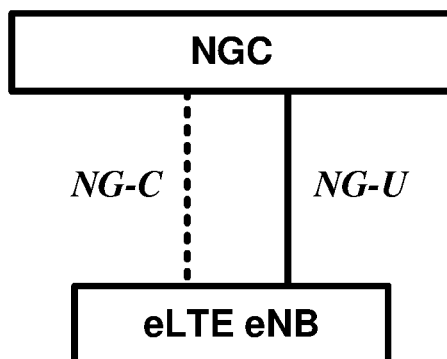

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

CA and Multi-Connectivity

Figure 6:
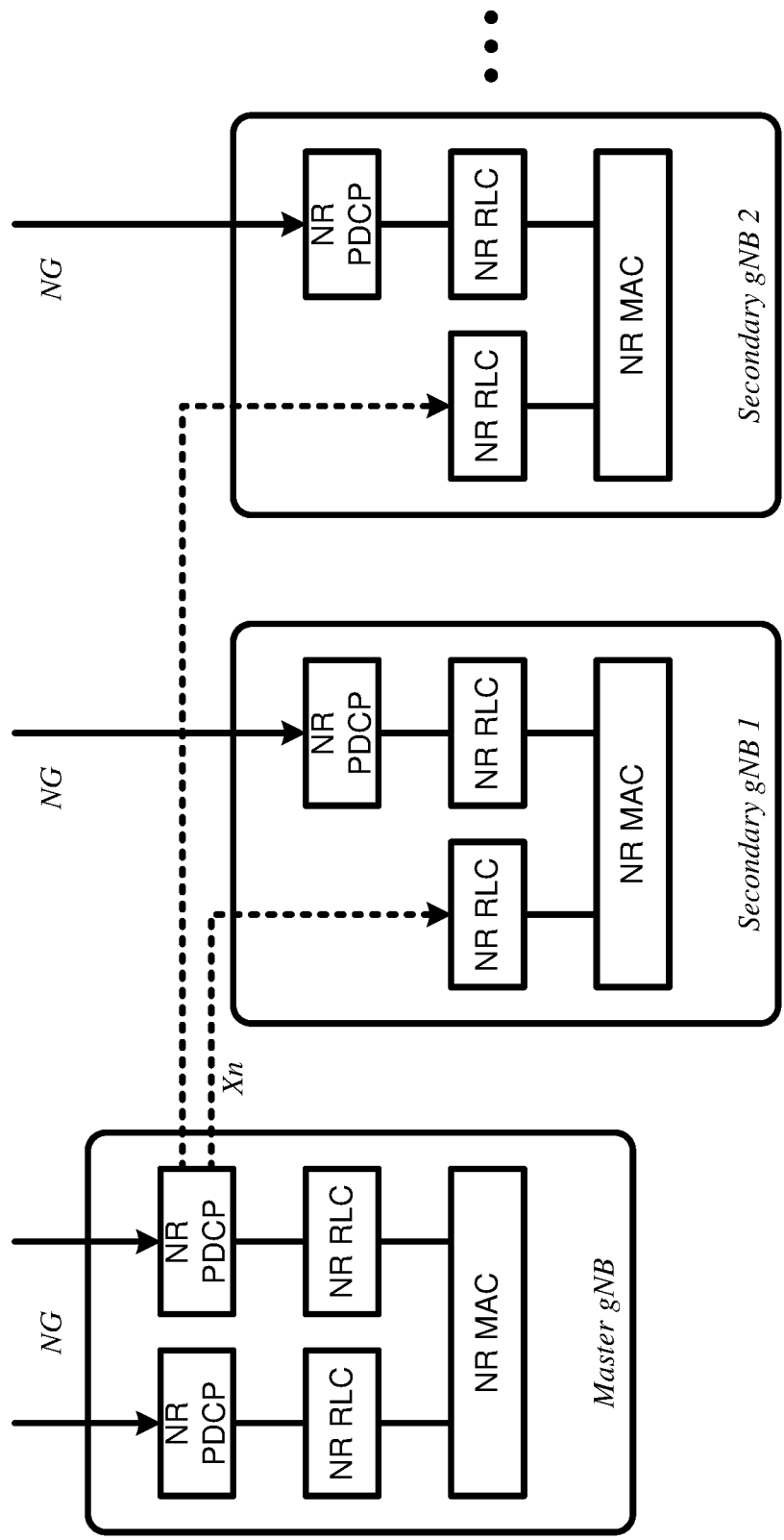
FIG. 6 is an example diagram for a protocol structure with multi-connectivity as per an aspect of an embodiment of the present invention.
Figure 7:
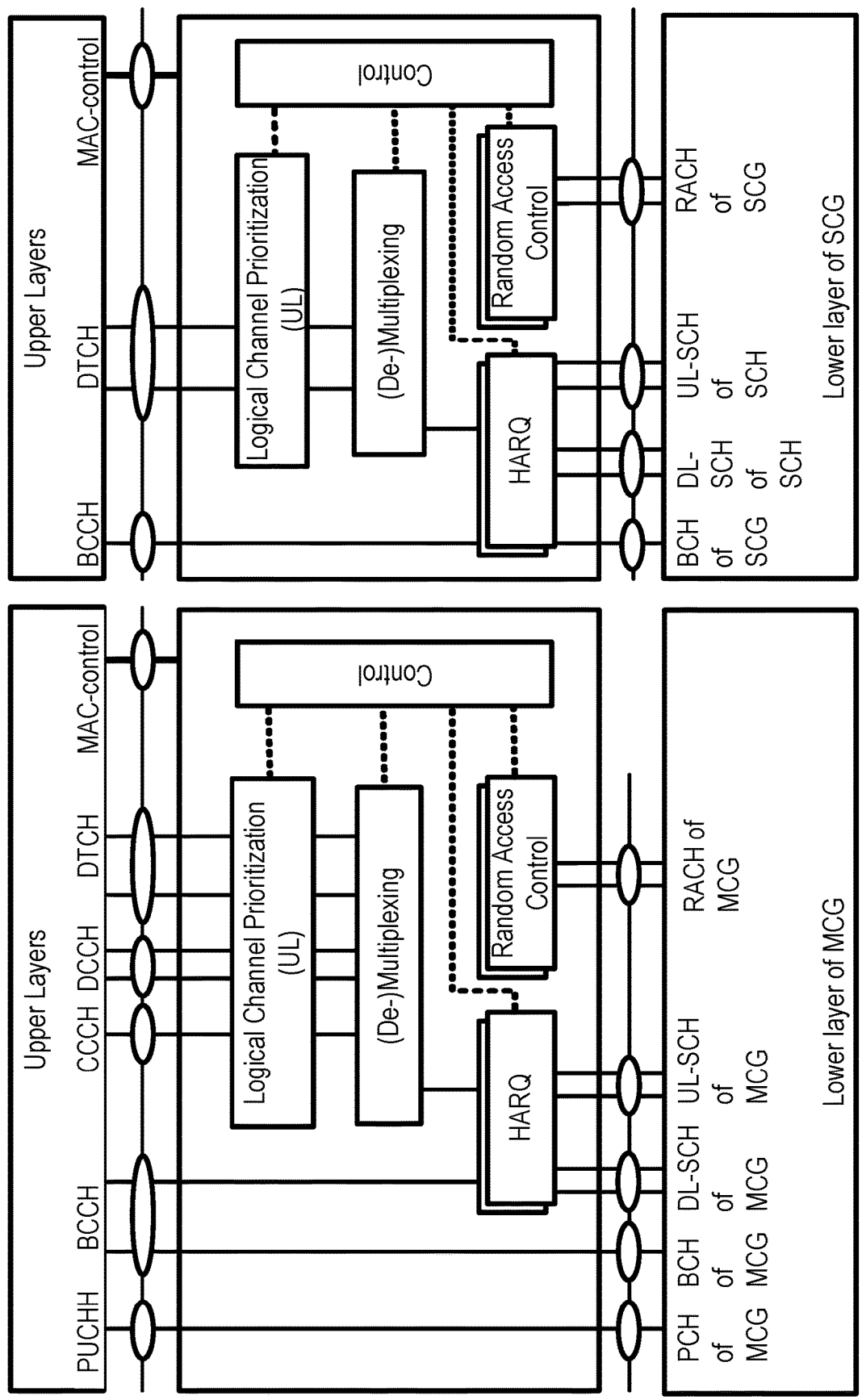
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
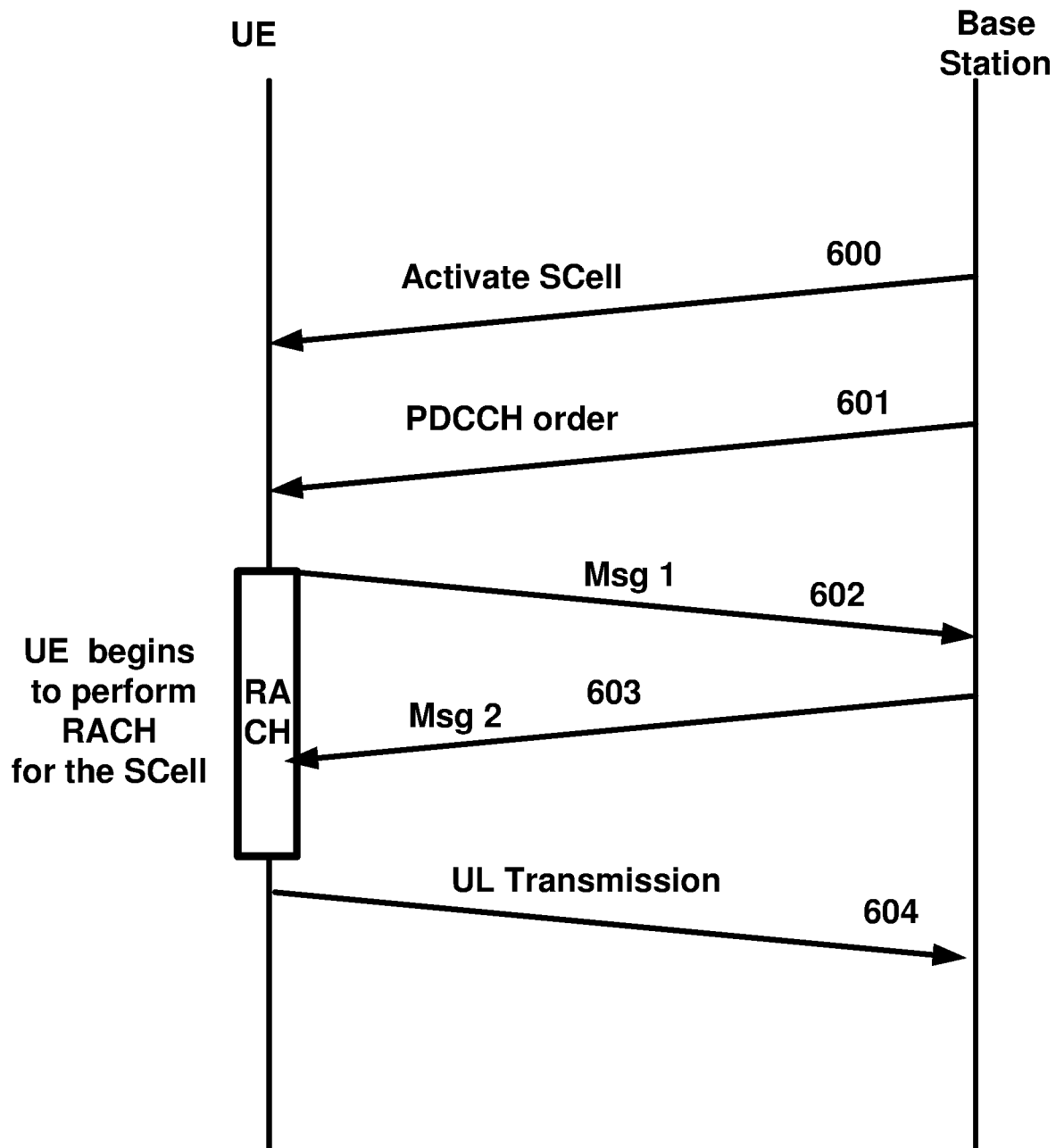
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

Tight Interworking

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
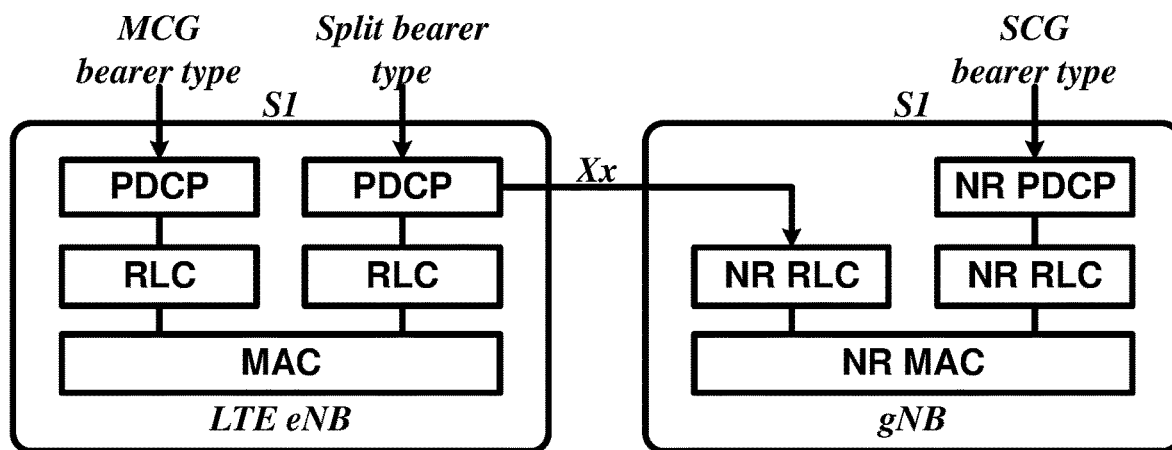
FIG. 12A, FIG. 12B, and FIG. 12C are example diagrams for radio protocol structures of tight interworking bearers as per an aspect of an embodiment of the present invention.
Figure 12B:
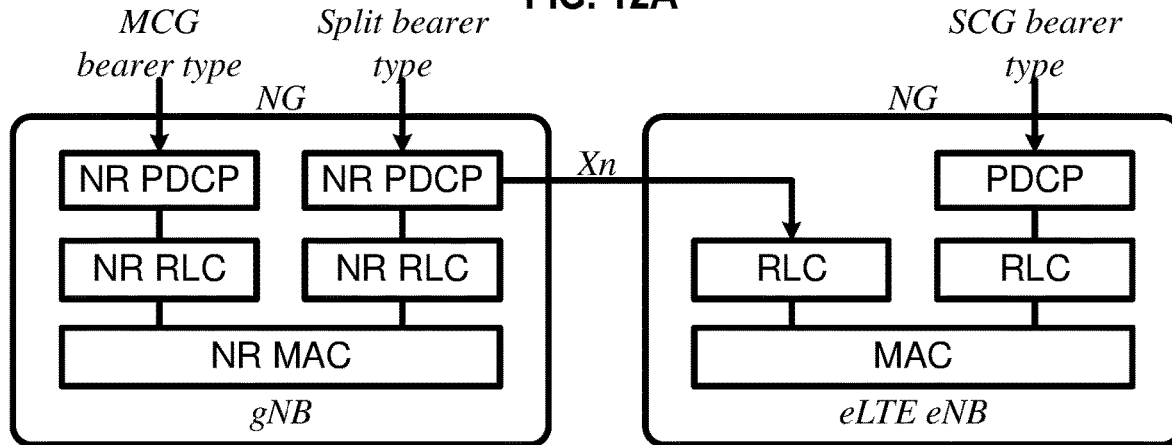
Figure 12C:
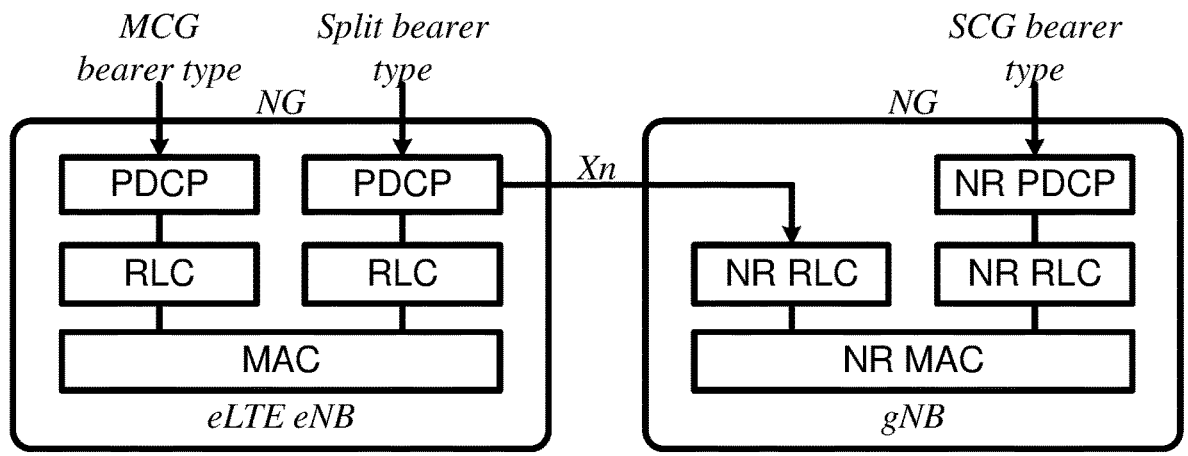

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Functional Split

Figure 13A:
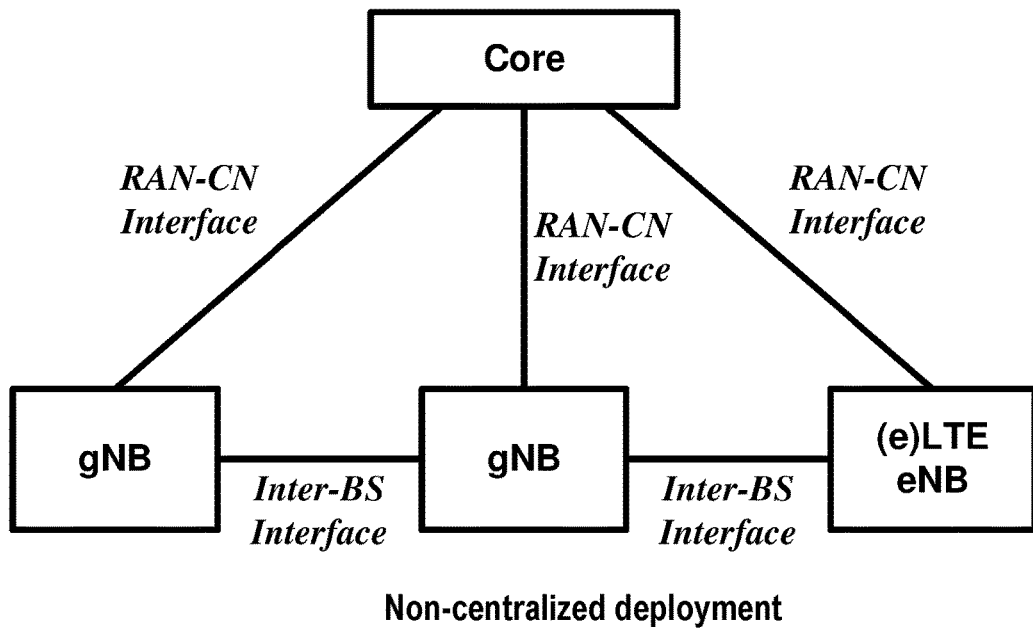
FIG. 13A and FIG. 13B are example diagrams for gNB deployment scenarios as per an aspect of an embodiment of the present invention.
Figure 13B:
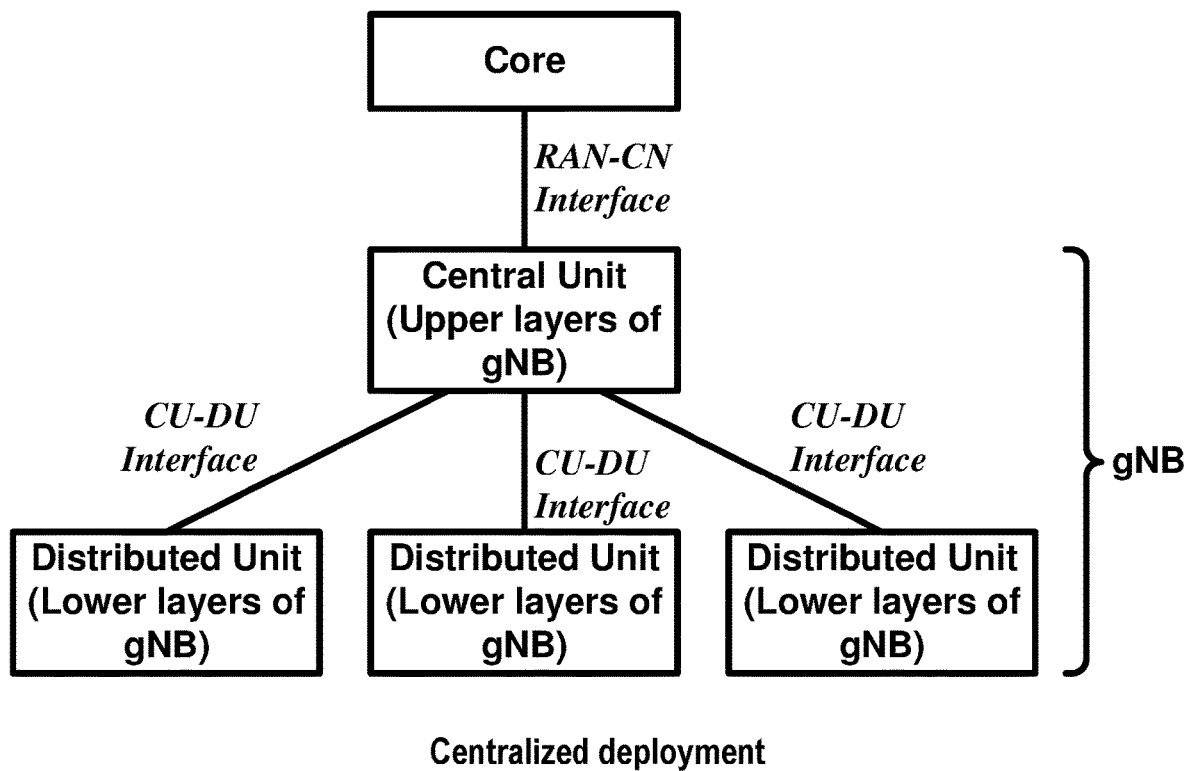

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
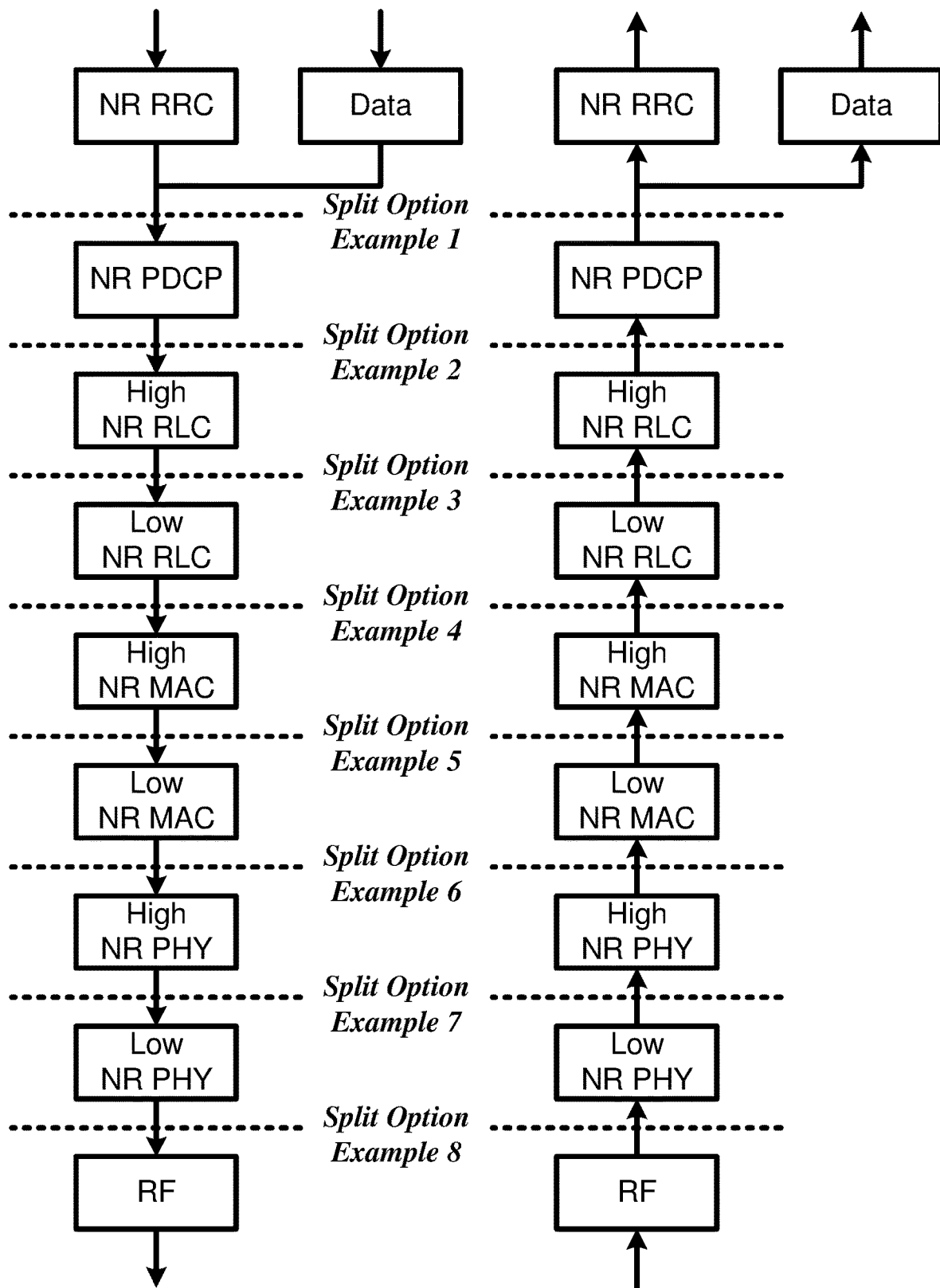
FIG. 14 is a diagram of an example functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

Network Slice

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice. LAA The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example cellular network system, a wireless device may be served with network slices for one or more services. In an example, network slices may be configured to serve ultra-reliable low-latency communications (URLLC) services, enhanced mobile broadband (eMBB) services, massive machine type communications (mMTC) services, and/or other types of services.

In a cellular network system, certain type of network slices may be supported in limited area, for example, one or more cells or one or more base stations. In a cell or a base station, resources (e.g. radio resources, network resources) for certain type of slices may be limited. In an example, if a wireless device requires a certain network slice type, and if a serving cell or a serving base station does not support the certain network slice type and/or does not have enough resources for the certain network slice type, the serving base station may handover the wireless device to a neighboring cell supporting the certain network slice type. A handover target base station of the neighboring cell supporting the certain network slice type may accept or reject a handover request for the wireless device. In an existing cellular network, a handover target base station may not recognize that a reason of initiating a handover is to provide a wireless device with a certain network slice type (e.g. a reason of handover is because a handover source base station does not support a certain network slice type or does not have resources to support a certain network slice type). Implementation of existing handover procedures may increase service interruption and/or handover failure rate when a wireless device requires a certain network slice. The existing technology may increase call dropping rate, service interruption, and packet transmission delay for a wireless device. The increased call dropping rate, increased service interruption, and/or the increased packet transmission delay may decrease communication system reliability.

Example embodiments enhance handover procedures for a wireless device requiring network slice support, by providing a handover target base station with handover cause information indicating that a handover request is to support a network slice for a wireless device. Example embodiments may reduce service interruption and/or handover failure rate by enabling handover target base stations to recognize a handover cause for network slice support. Example embodiments may improve communication reliability by supporting network slice based handover cause information during handover procedures.

In an example embodiment, a base station may initiate a handover of a wireless device that requires one or more services associated with a network slice because the base station may not support at least one of the one or more services associated with the network slice. In an example, a base station may transmit a handover request to a neighbouring base station with an indication informing that the handover is initiated to support one or more services and/or one or more network slices to a wireless device. In an example, the neighbouring base station may accept or reject the handover request at least based on the indication. In an example, if a target base station does not accept a handover request for a wireless device requiring one or more services and/or one or more network slices, it may inform a source base station that the target base station and/or its cell does not support at least one of the one or more services and/or the one or more network slices.

Network Slicing

Network Slicing may allow differentiated treatment depending on each customer requirements. With slicing, Mobile Network Operators (MNO) may be able to consider customers as belonging to different tenant types with each having different service requirements that may govern in terms of what slice types each tenant may be eligible to use based on Service Level Agreement (SLA) and subscriptions. NSSAI (Network Slice Selection Assistance Information) may include one or more S-NSSAIs (Single NSSAI). Each network slice may be uniquely identified by a S-NSSAI. A UE may store a Configured and/or Accepted NSSAI per PLMN. The NSSAI can have standard values or PLMN specific values. In an example, for signaling between RAN and CN, a Slice ID is represented by an NSSAI and/or S-NSSAI.

The following key principles may apply for support of Network Slicing in RAN. RAN awareness of slices may mean that RAN may support a differentiated handling of traffic for different network slices which have been pre-configured. How RAN supports the slice enabling in terms of RAN functions (i.e. the set of network functions that comprise each slice) may be implementation dependent. Selection of RAN part of the network slice may mean that RAN may support the selection of the RAN part of the network slice, by one or more slice ID(s) provided by the UE or the CN which may unambiguously identify one or more of the pre-configured network slices in the PLMN. The Accepted NSSAI may be sent by CN to UE and RAN after network slice selection. Resource management between slices may mean that RAN may support policy enforcement between slices as per service level agreements. It may be possible for a single RAN node to support multiple slices. The RAN may be free to apply the best RRM policy for the SLA in place to each supported slice. Support of QoS may mean that RAN may support QoS differentiation within a slice.

RAN selection of CN entity may be supported. For initial attach, the UE may provide one or more slice ID(s). If available, RAN may use the slice ID(s) for routing the initial NAS to an NGC CP function. If the UE does not provide any slice ID(s), the RAN may send the NAS signalling to a default NGC CP function. For subsequent accesses, the UE may provide a Temp ID, which may be assigned to the UE by the NGC, to enable the RAN to route the NAS message to the appropriate NGC CP function as long as the Temp ID is valid (RAN may be aware of and may be able to reach the NGC CP function which may be associated with the Temp ID). Otherwise, the methods for initial attach may apply. Resource isolation between slices may be supported by RAN. RAN resource isolation may be achieved by means of RRM policies and protection mechanisms that may avoid that shortage of shared resources in one slice may break the service level agreement for another slice. It may be possible to fully dedicate RAN resources to a certain slice.

Slice Availability may be dependent on RAN. Some slices may be available only in part of the network. Awareness in a gNB of the slices supported in the cells of its neighboring gNBs may be beneficial for inter-frequency mobility in connected mode. It may be assumed that the slice configuration may not change within the UE's registration area. The RAN and the CN may be responsible to handle a service request for a slice that may or may not be available in a given area. Admission or rejection of access to a slice may depend by factors such as support for the slice, availability of resources, support of the requested service by other slices. Slice availability in RAN may be handled during mobility. Neighbour gNBs may exchange slice availability on the interface connecting two nodes, e.g. Xn interface between gNBs. The core network may provide the RAN a mobility restriction list. This list may include those TAs (Tracking Areas) which support or do not support the slices for the UE. The slices supported at the source node may be mapped, if possible, to other slices at target node. Examples of possible mapping mechanisms may be one of: mapping by the CN, when there may be naturally a signalling interaction between RAN and CN and performance may be thus not impacted; mapping by the RAN as action following prior negotiation with the CN during UE connection setup; and/or mapping by the RAN autonomously if prior configuration of mapping policies took place at RAN. UE associating with multiple network slices simultaneously may be supported. In case a UE is associated with multiple slices simultaneously, only one signalling connection may be maintained.

In an example, to make mobility slice-aware in case of Network Slicing, Slice ID may be introduced as part of the PDU session information that may be transferred during mobility signalling. This may enable slice-aware admission and congestion control. When a target cell is selected, handover signalling may be initiated. Such procedure may attempt to move PDU Session resources for active slices of the UE from one source node to a target node. The source gNB may need to pass on slices that a UE in question may be using to a target gNB as part of the HO procedure. If a handover procedure involves a NGC (core network node), during such procedure the target AMF (Access and Mobility Management Function, e.g. core network node) may be responsible for aligning the set of slices supported in the new Registration Area between UE and network at NAS level. PDU Sessions that may be associated with the removed slices may be not admitted at target node.

In an example, a core network node may be responsible on validating that the UE has the rights to access a network slice. Prior to receiving the Initial Context Setup Request message, the RAN may be allowed to apply some provisional/local policies, based on awareness of which slice the UE may be requesting access to. The CN may be aware of network slices the UE may belong to. During the initial context setup, the RAN may be informed for network slices for which resources may be requested.

In an example, to respect the key principles for the support of Network Slicing in RAN, slice awareness in RAN may be introduced at PDU session level, by indicating the Slice ID corresponding to the PDU Session. This may imply that: QoS flows within a PDU session may belong to the same network slice; within a slice, QoS differentiation may be supported; connection of a UE to multiple network slices may be supported, as multiple PDU sessions per UE may be able to be established; as a consequence of slice awareness at PDU Session level, user data pertinent to different network slices may not share the same NG-U tunnel; by adding the Slice ID information to the PDU session information, mobility signalling may become also slice-aware and may enable per-slice admission and congestion control.

In an example, following the initial access, the establishment of the RRC connection and the selection of the correct CN instance, the CN may establish the complete UE context by sending the Initial Context Setup Request message to the gNB over NG-C interface. The message may contain the Slice ID as part of the PDU session(s) resource description. Upon successful establishment of the UE context and allocation of PDU resources to the relevant NW slice(s), the RAN may response with the Initial Context Setup Response message.

In an example, when new PDU sessions need to be established or existing ones modified or released, the CN may request the RAN to allocate/release resources relative to the relevant PDU sessions by means of the PDU Session Setup/Modify/Release procedures over NG-C interface. In case of network slicing, Slice ID information may be added per PDU session, so RAN may be enabled to apply policies at PDU session level according to the SLA represented by the network slice, e.g. while still being able to apply differentiated QoS within the slice. RAN may confirm the establishment/modification/release of a PDU session associated to a certain network slice by responding with the PDU Session Setup/Modify/Release Response message over the NG-C interface.

Figure 15:
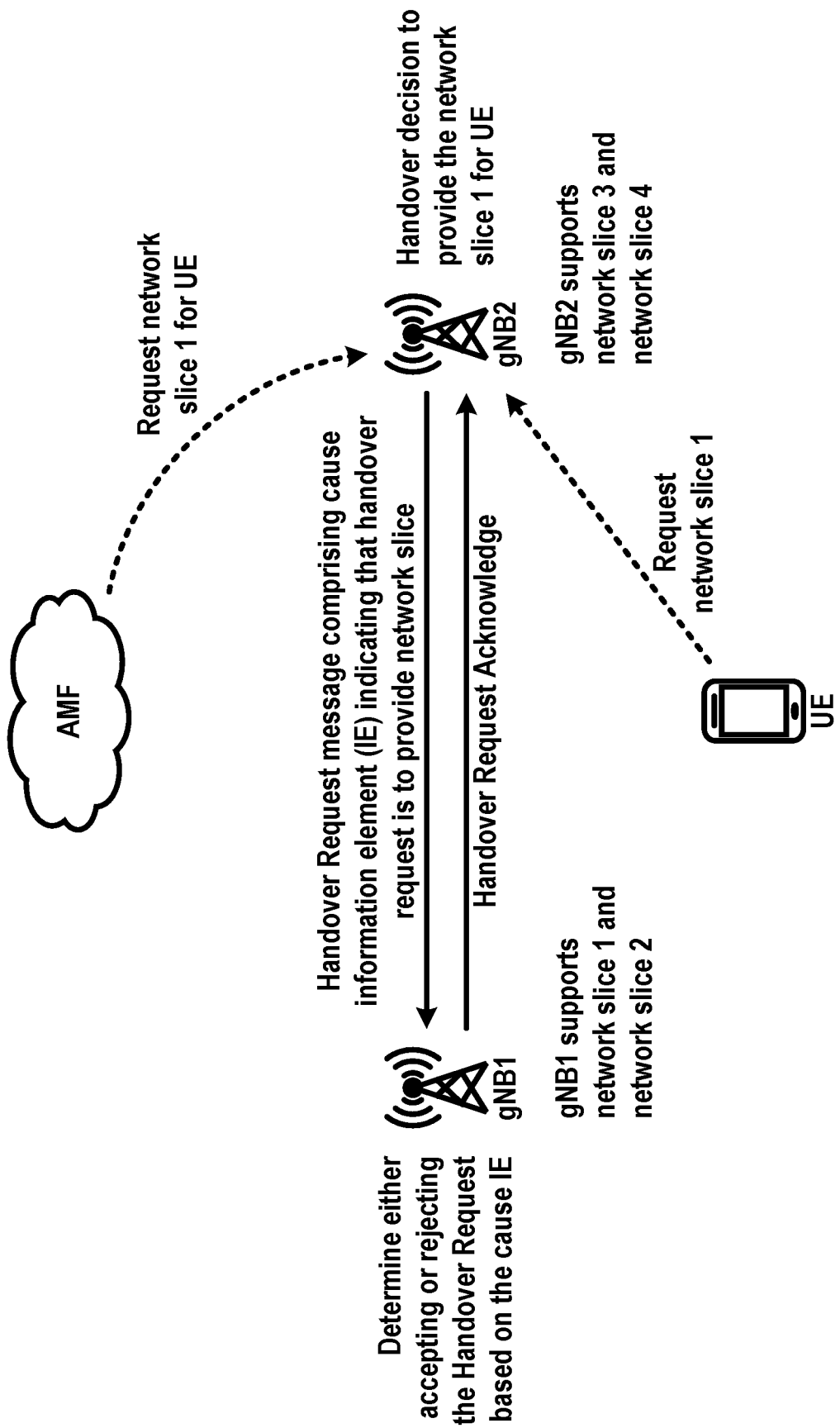
FIG. 15 is an example diagram as per an aspect of an embodiment of the present disclosure.

In an example embodiment, as shown in FIG. 15, a wireless device may request a network slice and/or a service associated with the network slice to a core network entity (e.g. AMF: Access and Mobility Management Function) via a logical interface (e.g. NAS interface) between the wireless device and the core network entity and/or via a serving base station. The core network entity receiving the request may transmit, to the serving base station serving, a third message configured to inform that the wireless device requires the network slice and/or the service associated with the network slice. The third message may comprise a network slice identifier (e.g. S-NSSAI and/or NSSAI) of the network slice. In an example, the third message may be configured to request for the serving base station to establish one or more bearers (and/or one or more packet flows) for the network slice and/or the service to support the request of the wireless device. In an example, the third message may comprise an indication indicating that the serving base station is required to provide the network slice and/or the service associated with the network slice to the wireless device. In an example, the third message may comprise an indication indicating that the serving base station is required to handover the wireless device to another base station that supports the network slice and/or the service associated with the network slice.

In an example, the wireless device may directly request a network slice support and/or a service associated with a network slice to a first base station by transmitting a fourth message to the serving base station. The fourth message may comprise a network slice identifier of the network slice.

Figure 16:
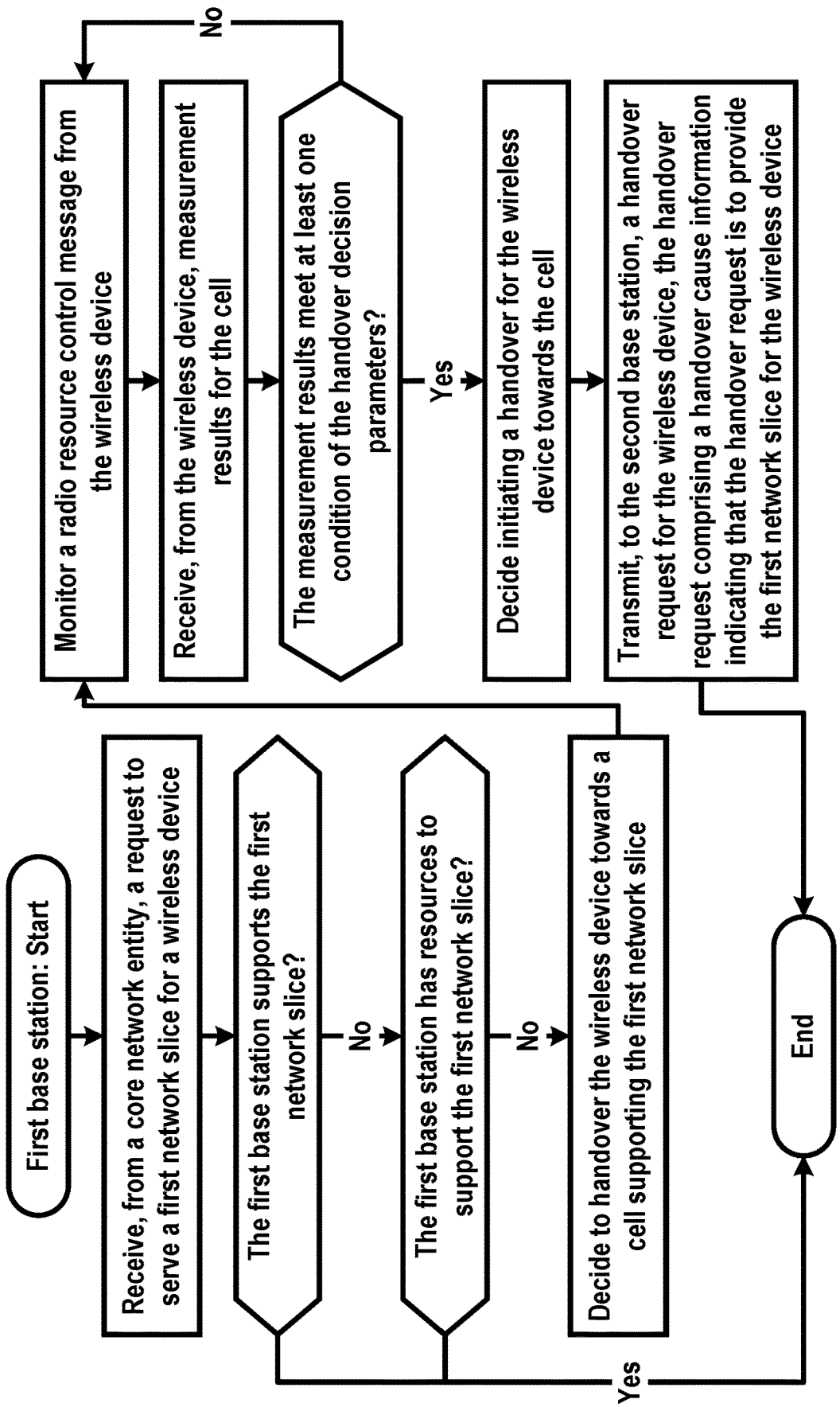
FIG. 16 is an example diagram as per an aspect of an embodiment of the present disclosure.
Figure 18:
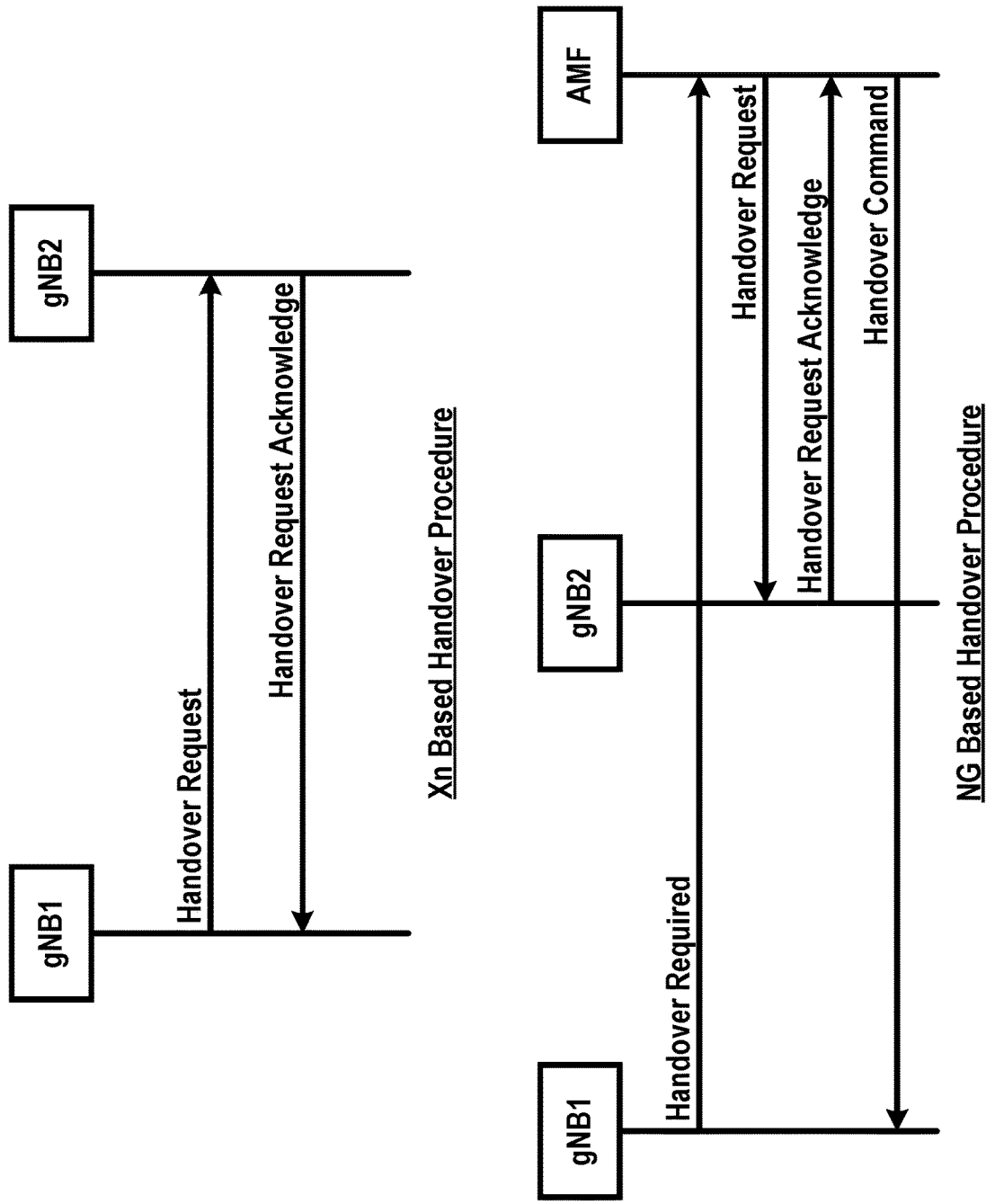
FIG. 18 is an example diagram as per an aspect of an embodiment of the present disclosure.
Figure 19:
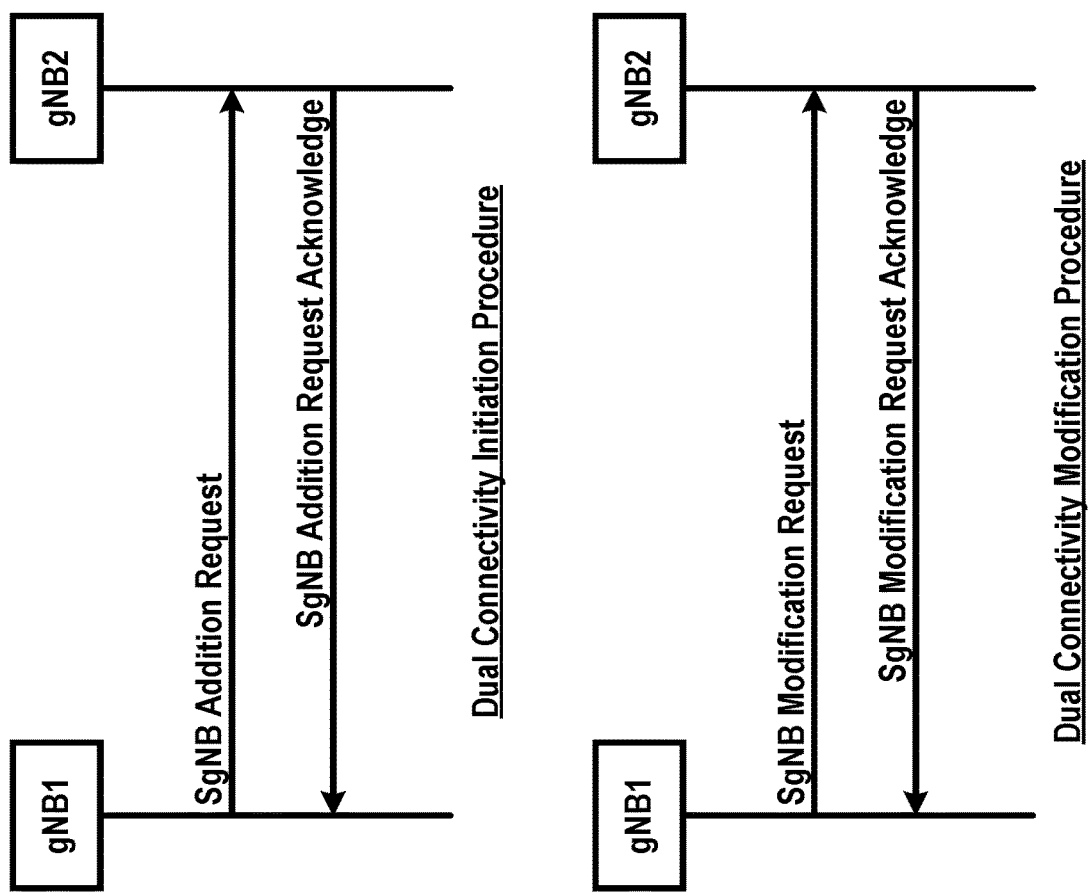
FIG. 19 is an example diagram as per an aspect of an embodiment of the present disclosure.

In an example, as shown in FIG. 16, the serving base station (e.g. the first base station in FIG. 16) may transmit a first message to a target base station (e.g. the second base station in FIG. 16) in response to the third message and/or the fourth message. The first message may be a handover request message as shown in FIG. 18, an SgNB addition request message, and/or an SgNB modification request message as shown in FIG. 19. In an example, the first message may be configured to request a handover of the wireless device towards a first cell of the target base station. In an example, the first message may be configured to request a multi connectivity (and/or a dual connectivity) with the target base station. In an example, the first message may be configured to request a modification of a multi connectivity (and/or a dual connectivity) with the target base station. In an example, the first message may comprise a cause value indicating that the request of the handover, the multi connectivity initiation, and/or the multi connectivity modification may be to support a network slice and/or a service associated with the network slice. In an example, the cause value may indicate that the network slice may not be supported by the serving base station. In an example, the cause value may indicate that the network slice may not be provided by the serving base station due to a high traffic load of the network slice and/or the service. The first message may further comprise a wireless device identifier of the wireless device, one or more network slice identifiers, one or more packet flow identifiers (e.g. bearer identifiers) associated one or more of the network slice identifiers, one or more cell identifiers, and/or the like.

Figure 17:
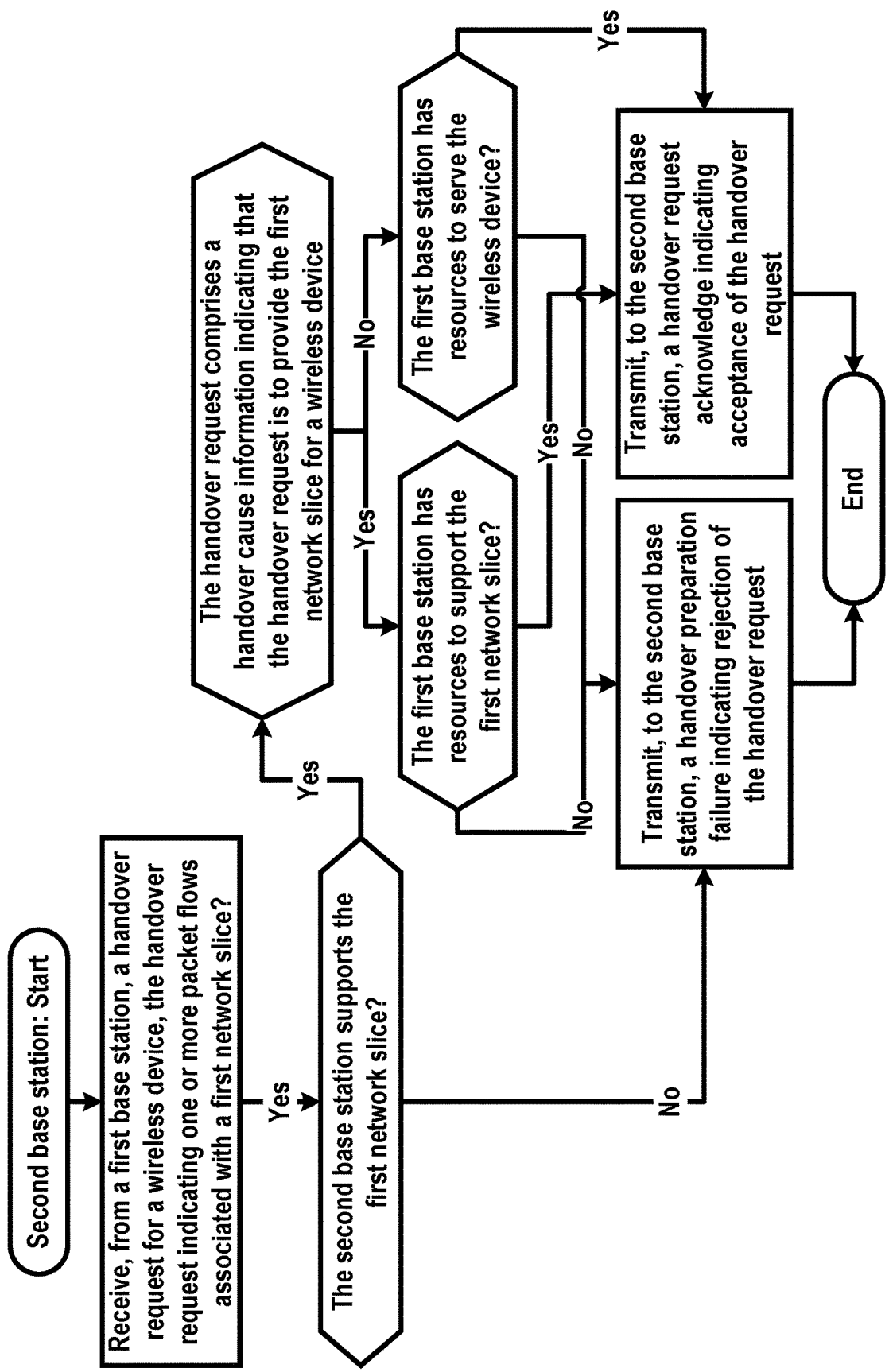
FIG. 17 is an example diagram as per an aspect of an embodiment of the present disclosure.

In an example, as shown in FIG. 17, in response to receiving the first message, the target base station (e.g. the second base station in FIG. 17) may make a decision on whether accepting the request of the serving base station (e.g. the first base station in FIG. 17) at least based on one or more elements of the first message. In an example, if the target base station supports the network slice and/or the service associated with the network slice that the wireless device requires, the target base station may decide to accept the request of the serving base station. In an example, if the first cell of the target base station supports the network slice and/or the service associated with the network slice, the target base station may decide to accept the handover request for the wireless device. In an example, if one or more cells of the target base station supports the network slice and/or the service associated with the network slice, the target base station may decide to accept the multi connectivity initiation and/or modification request for the wireless device. In an example, if one or more cells of the target base station support the network slice and/or the service associated with the network slice, the target base station may decide to accept the request for the wireless device even if a traffic load of the one or more cells (e.g. handover target cell) is high, at least based on the cause value, e.g. because if the target base station does not accept the request the wireless device may not be supported with the network slice.

In an example, at least based on the decision of accepting the request, the target base station may transmit a second message to the serving base station. The second message may be configured to indicate that the target base station accepts the request of the serving base station. The second message may be a handover request acknowledge message if the first message is a handover request message. The second message may be an SgNB addition request acknowledge message if the first message is an SgNB addition request message. The second message may be an SgNB modification request acknowledge message if the first message is an SgNB modification request message.

In an example, if the target base station (e.g. the target base station, the first cell, and/or one or more cells of the target base station) does not support the network slice and/or the service associated with the network slice that the wireless device requires, the target base station may decide to reject the request of the serving base station at least based on one or more elements of the first message. In response to the decision of rejection, the target base station may transmit a second message to the serving base station. The second message may be configured to indicate that the target base station rejects the request of the serving base station. The second message may be a handover preparation failure message if the first message is a handover request message. The second message may be an SgNB addition request reject message if the first message is an SgNB addition request message. The second message may be an SgNB modification request reject message if the first message is an SgNB modification request message.

In an example, the second message may comprise a reject cause value indicating that the target base station rejects the request of the serving base station because the target base station, the first cell, and/or one or more cells of the target base station does not support the network slice and/or the service associated with the network slice that the wireless device requires. In an example, the reject cause value may indicate that the target base station rejects the request of the serving base station because the target base station, the first cell, and/or one or more cells of the target base station may not be able to provide the network slice and/or the service associated with the network slice that the wireless device requires, due to a high traffic load of the network slice and/or the service.

In an example, if the target base station (e.g. the target base station, the first cell, and/or one or more cells of the target base station) does not support the network slice and/or the service associated with the network slice that the wireless device requires, the target base station may decide to reject providing the network slice and/or the service. In response to deciding the rejection of providing the network slice and/or the service, the target base station may transmit a second message to the serving base station. The second message may be configured to indicate that the target base station does not provide the network slice and/or the service associated with the network slice. The second message may be a handover request acknowledge message if the first message is a handover request message. The second message may be an SgNB addition request acknowledge message if the first message is an SgNB addition request message. The second message may be an SgNB modification request acknowledge message if the first message is an SgNB modification request message. In an example, the second message may comprise a reject cause value, one or more first network slice identifiers of one or more rejected network slices, one or more second network slice identifiers of one or more accepted network slices, one or more first packet flow identifiers (e.g. bearer identifier) associated with the one or more rejected network slices, and/or one or more second packet flow identifiers associated with the one or more accepted network slices.

In an example, the reject cause value may indicate that the target base station rejects the network slice and/or the service associated with the network slice because the target base station, the first cell, and/or one or more cells of the target base station does not support the network slice and/or the service associated with the network slice that the wireless device requires. In an example, the reject cause value may indicate that the target base station rejects the network slice and/or the service because the target base station, the first cell, and/or one or more cells of the target base station may not be able to provide the network slice and/or the service due to a high traffic load of the network slice and/or the service.

In an example, a first base station may receive, from a second base station, a first message configured to request a handover for a first wireless device towards a first cell, the first message comprising a handover cause indicating that the handover may be initiated to support one or more network slices. The first base station may make a decision on whether accepting the handover request at least based on the handover cause. The first base station may transmit, to the second base station, a second message configured to indicate a result of the decision. In an example, the first message may further comprise at least one of: a network slice identifier of one of the one or more network slices; a packet flow identifier associated with a network slice identifier; a wireless device identifier of the first wireless device; and/or a cell identifier of the first cell.

In an example, the second message may further comprise a reject cause for at least one of the handover request and/or one of the one or more network slices, the reject cause indicating that at least one of the one or more network slices may not be supported by at least one of the first cell and/or the first base station. The second message may further comprise one or more network slice identifiers of one or more accepted network slices.

In an example, the second base station may transmit the first message at least based on a third message received from a core network entity, the third message comprising a network slice identifier required for the wireless device. In an example, the second base station may transmit the first message at least based on a fourth message received from the wireless device, the fourth message comprising a network slice identifier required for the wireless device.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 20 is an example flow diagram as per an aspect of an embodiment of the present disclosure. At 2010, a first base station may receive from a core network entity, a first message indicating a request for a session resource for a wireless device. The session resource may be associated with a first network slice. At 2020, the first base station may send a second message to a second base station. The second message may indicate a handover request for the wireless device towards a first cell of the second base station. The first message may comprise: a packet flow identifier of a packet flow associated with the first network slice; a network slice identifier of the first network slice; and a cause information element. The cause information element may indicate that the handover request may to provide at least one network slice for the wireless device. The at least one network slice may comprise the first network slice. At 2030, the first base station may receive from the second base station, a third message indicating an acceptance or a rejection based on the second message.

According to an embodiment, the second base station may determine the acceptance or the rejection based on at least one of: the cause information element; or a traffic load status of one or more cells of the second base station for the first network slice, the one or more cells comprising the first cell. According to an embodiment, the second message may further comprise: a wireless device identifier of the wireless device; and a cell identifier of the first cell. According to an embodiment, the third message may further comprise a rejection cause for rejecting at least one of the handover request or the packet flow associated with the first network slice. The rejection cause may indicate that the first network slice is not supported by at least one of: the first cell; or the second base station. According to an embodiment, the third message may further comprise at least one of: an admitted packet flow identifier of an admitted packet flow; or a non-admitted packet flow identifier of a non-admitted packet flow. According to an embodiment, the network slice identifier may comprise at least one of: a network slice selection assistance information; or a single network slice selection assistance information. According to an embodiment, the core network entity may send the first message based on a session creation request from the wireless device. The session creation request may be associated with the first network slice.

FIG. 21 is an example flow diagram as per an aspect of an embodiment of the present disclosure. At 2110, a first base station may receive from a second base station, a first message indicating a handover request for the wireless device towards a first cell of the first base station. The first message may comprise a packet flow identifier of a packet flow associated with a first network slice; a network slice identifier of the first network slice; and a cause information element. The cause information element may indicate that the handover request may provide at least one network slice for the wireless device. The cause information element may be based on a request of a core network entity for a session resource for the wireless device. The session resource may be associated with the first network slice. At 2120, the first base station may send a second message to the second base station. The second message may indicate an acceptance or a rejection based on the first message.

According to an embodiment, the first base station may determine the acceptance or the rejection based on at least one of: the cause information element; or a traffic load status of one or more cells of the first base station for the first network slice. The one or more cells may comprise the first cell. According to an embodiment, the first message may further comprise: a wireless device identifier of the wireless device; and a cell identifier of the first cell. According to an embodiment, the second message may further comprise a rejection cause for rejecting at least one of the handover request or the packet flow associated with the first network slice. The rejection cause may indicate that the first network slice is not supported by at least one of: the first cell; or the first base station. According to an embodiment, the second message may further comprise at least one of: an admitted packet flow identifier of an admitted packet flow; or a non-admitted packet flow identifier of a non-admitted packet flow. According to an embodiment, the network slice identifier may comprise at least one of: a network slice selection assistance information; or a single network slice selection assistance information.

FIG. 22 is an example flow diagram as per an aspect of an embodiment of the present disclosure. At 2210, a first base station may receive a first message from a wireless device. The first message may indicate that the wireless device requires a service associated a first network slice. At 2220, the first base station may send to a second base station, a second message indicating a handover request for the wireless device towards a first cell of the second base station. The first message may comprise: a packet flow identifier of a packet flow associated with the first network slice; a network slice identifier of the first network slice; and a cause information element. The cause information element may indicate that the handover request may be to provide at least one network slice for the wireless device. The at least one network slice may comprise the first network slice. At 2230, the first base station may receive a third message from the second base station. The third message may indicate an acceptance or a rejection based on the first message.

FIG. 23 is an example flow diagram as per an aspect of an embodiment of the present disclosure. At 2310, a first base station may receive a first message from a core network entity. The first message may indicate a request for a session resource for a wireless device. The session resource may be associated with a first network slice. At 2320, the first base station may send a second message to a second base station. The second message may indicate a secondary node addition/modification request for the wireless device. The first message may comprise: a packet flow identifier of a packet flow associated with the first network slice; a network slice identifier of the first network slice; and a cause information element. The cause information element may indicate that the secondary node addition/modification request may be to provide at least one network slice for the wireless device. The at least one network slice may comprise the first network slice. At 2330, the first base station may receive a third message from the second base station. The third message may indicate an acceptance or a rejection based on the first message.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to".

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a first base station from a core network entity, a first message indicating a request for session resources for a wireless device, wherein the session resources are for a first network slice;
   initiating, by the first base station and based on the requested session resources for the first network slice not being available for the wireless device at the first base station, a handover for the wireless device towards a first cell of a second base station;
   sending, from the first base station to the second base station and after a determination that the requested session resources for the network slice associated with the first base station are not available for the wireless device, a request for the handover of the wireless device, the request comprising:
      a packet flow identifier of a packet flow associated with the first network slice;
      a network slice identifier of the network slice for the handover; and
      a cause information element indicating that a cause for the handover is that the session resources are not available at the first base station for the network slice associated with the network slice identifier; and
   receiving, from the second base station, a response to the request.

2. The method of claim 1, wherein the second base station determines the response based on at least one of:
   the cause information element; or
   a traffic load status of one or more cells of the second base station for the network slice.

3. The method of claim 1, wherein the request further comprises:
   a wireless device identifier of the wireless device.

4. The method of claim 3, wherein the request further comprises a cell identifier of a first cell of the second base station.

5. The method of claim 4, wherein the response further comprises a rejection cause for rejecting at least one of the request or the packet flow associated with the network slice, the rejection cause indicating that the network slice is not supported by at least one of:
   the first cell of the second base station; or
   the second base station.

6. The method of claim 1, wherein the response further comprises at least one of:
   an admitted packet flow identifier of an admitted packet flow; or
   a non-admitted packet flow identifier of a non-admitted packet flow.

7. The method of claim 1, wherein the network slice identifier of the network slice comprises
   a network slice selection assistance information.

8. The method of claim 1, wherein the network slice identifier of the network slice comprises a single network slice selection assistance information.

9. The method of claim 1, wherein the core network entity sends the message based on a session creation request from the wireless device, the session creation request associated with the network slice.

10. The method of claim 1, wherein the response comprises an acceptance or rejection of the request.

11. A first base station comprising:
    one or more processors; and
    memory storing instructions that, when executed by the one or more processors, cause the first base station to:
       receive, by a first base station from a core network entity, a first message indicating a request for session resources for a wireless device, wherein the session resources are for a first network slice;
       initiate, by the first base station and based on the requested session resources for the first network slice not being available for the wireless device at the first base station, a handover for the wireless device towards a first cell of a second base station;
       send to the second base station and after a determination that the requested session resources for the network slice associated with the first base station are not available for the wireless device, a request for the handover of the wireless device, the request comprising:
          a packet flow identifier of a packet flow associated with the first network slice;
          a network slice identifier of a network slice for the handover; and
          a cause information element indicating that a cause for the handover is that the session resources are not available at the first base station for the network slice associated with the network slice identifier; and
       receive, from the second base station, a response to the request.

12. The first base station of claim 11, wherein the second base station determines the response based on at least one of:
    the cause information element; or
    a traffic load status of one or more cells of the second base station for the network slice.

13. The first base station of claim 11, wherein the request further comprises:
    a wireless device identifier of the wireless device.

14. The first base station of claim 13, wherein the request further comprises a cell identifier of a first cell of the second base station.

15. The first base station of claim 14, wherein the response further comprises a rejection cause for rejecting at least one of the request or the packet flow associated with the network slice, the rejection cause indicating that the network slice is not supported by at least one of:
    the first cell of the second base station; or
    the second base station.

16. The first base station of claim 11, wherein the response further comprises at least one of:
    an admitted packet flow identifier of an admitted packet flow; or
    a non-admitted packet flow identifier of a non-admitted packet flow.

17. The first base station of claim 11, wherein the network slice identifier of the network slice comprises
a network slice selection assistance information.

18. The first base station of claim 11, wherein the network slice identifier of the network slice comprises a single network slice selection assistance information.

19. The first base station of claim 11, wherein the core network entity sends the message based on a session creation request from the wireless device, the session creation request associated with the network slice.

20. A non-transitory computer-readable medium comprising instructions that, when executed by one or more processors of a device, cause a first base station to perform:
receiving, from a core network entity, a first message indicating a request for session resources for a wireless device, wherein the session resources are for a first network slice;
initiating, based on the requested session resources for the first network slice not being available for the wireless device at the first base station, a handover for the wireless device towards a first cell of a second base station;
sending, to the second base station and after a determination that the requested session resources for the network slice associated with the first base station are not available for the wireless device, a request for the handover of the wireless device, the request comprising:
a packet flow identifier of a packet flow associated with the first network slice;
a network slice identifier of the network slice for the handover; and
a cause information element indicating that a cause for the handover is that the session resources are not available at the first base station for the network slice associated with the network slice identifier; and
receiving, from the second base station, a response to the request.

* * * * *